(12) United States Patent
Mar

(10) Patent No.: US 6,980,555 B2
(45) Date of Patent: Dec. 27, 2005

(54) POLICY CHANGE CHARACTERIZATION METHOD AND APPARATUS

(75) Inventor: Aaron S. Mar, Vancouver (CA)

(73) Assignee: Redback Networks Inc., San Jose, CA (US)

( * ) Notice: Subject to any disclaimer, the term of this patent is extended or adjusted under 35 U.S.C. 154(b) by 865 days.

(21) Appl. No.: 09/990,569

(22) Filed: Nov. 21, 2001

(65) Prior Publication Data

US 2002/0124086 A1 Sep. 5, 2002

(30) Foreign Application Priority Data

Nov. 24, 2000 (CA) .............................................. 2326851

(51) Int. Cl.[7] .............................................. H04L 12/56
(52) U.S. Cl. .................. 370/395.21; 370/389; 370/394; 370/395.42; 709/218; 709/226; 709/239; 709/252
(58) Field of Search ................................. 709/226, 218, 709/239, 252; 370/389, 395.21, 394, 395.42, 408, 351, 354

(56) References Cited

U.S. PATENT DOCUMENTS

| 4,736,363 | A | | 4/1988 | Aubin et al. | |
|---|---|---|---|---|---|
| 5,159,595 | A | | 10/1992 | Flanagan et al. | |
| 5,692,129 | A | * | 11/1997 | Sonderegger et al. | ... 707/103 R |
| 5,893,116 | A | * | 4/1999 | Simmonds et al. | ......... 707/201 |
| 5,987,471 | A | * | 11/1999 | Bodine et al. | .......... 707/103 R |
| 6,154,776 | A | * | 11/2000 | Martin | ....................... 709/226 |
| 6,259,699 | B1 | * | 7/2001 | Opalka et al. | .............. 370/398 |
| 6,459,682 | B1 | * | 10/2002 | Ellesson et al. | ............. 370/235 |
| 6,611,522 | B1 | * | 8/2003 | Zheng et al. | ........... 370/395.21 |
| 6,671,277 | B1 | * | 12/2003 | Sugai et al. | ........... 370/395.21 |
| 6,683,885 | B1 | * | 1/2004 | Sugai et al. | ................... 370/43 |
| 6,862,622 | B2 | * | 3/2005 | Jorgensen | ................... 709/226 |
| 2002/0057699 | A1 | * | 5/2002 | Roberts | ................. 370/395.32 |
| 2002/0099854 | A1 | * | 7/2002 | Jorgensen | ................... 709/249 |

OTHER PUBLICATIONS

Foster, Caxton, A Generalization of AVL Trees, Copyright 1973, Association for Computing Machinery, Inc.*
Foster, C.C., Information Storage and Retrieval Using AVL Trees, ACM 20th National Conference/1965.*

* cited by examiner

*Primary Examiner*—Saleh Najjar
*Assistant Examiner*—Ciara Martin
(74) *Attorney, Agent, or Firm*—Blakely, Sokoloff, Taylor & Zafman

(57) ABSTRACT

A method and apparatus is described for receiving a new policy tree at a network element in a network. The network element stores a current policy tree of classes for quality of service of packets being processed by the network element. Classes of the current policy tree are compared with the classes of the new policy tree. Classes of the current policy tree are selectively deleted and classes of the new policy tree are selectively added to the current policy tree based on the comparison of the classes.

27 Claims, 22 Drawing Sheets

POLICY CHANGE CHARACTERIZATION
METHOD AND APPARATUS

The present application claims priority to Canadian Application No. 2,326,851, filed under the Paris Convention for the Protection of Industrial Property in the Patent Branch of the Canadian Intellectual Property Office located at 50 Victoria Street, Room C229, Hull, Quebec K1A 0C9 Canada, on Nov. 24, 2000, entitled *Policy Change Characterization Method and Apparatus*.

FIELD OF THE INVENTION

This invention relates to data communication networks. More specifically, the invention relates to systems for facilitating the configuring of networks to provide desired levels of Quality of Service ("QoS") for data communication services on the networks.

BACKGROUND OF THE INVENTION

Maintaining efficient flow of information over data communication networks is becoming increasingly important in today's economy. Telecommunications networks are evolving toward a connectionless model from a model whereby the networks provide end-to-end connections between specific points. In a network which establishes specific end-to-end connections to service the needs of individual applications, the individual connections can be tailored to provide a desired bandwidth for communications between the end points of the connections. This is not possible in a connectionless network. The connectionless model is desirable because it saves the overhead implicit in setting up connections between pairs of endpoints and also provides opportunities for making more efficient use of the network infrastructure through statistical gains. Many networks today provide connectionless routing of data packets, such as Internet Protocol ("IP") data packets, over a network which includes end-to-end connections for carrying data packets between certain parts of the network. The end-to-end connections may be provided by technologies such as Asynchronous Transfer Mode ("ATM"), Time Division Multiplexing ("TDM") and SONET/SDH.

A Wide Area Network ("WAN") is an example of a network used to provide interconnections capable of carrying many different types of data between geographically separated nodes. For example, the same WAN may be used to transmit video images, voice conversations, e-mail messages, data to and from database servers, and so on. Some of these services place different requirements on the WAN.

A typical WAN comprises a shared network which is connected by access links to two or more geographically separated customer premises. Each of the customer premises may include one or more devices connected to the network. More typically, each customer premise has a number of computers connected to a local area network ("LAN"). The LAN is connected to the WAN access link at a service point. The service point is generally at a "demarcation" unit or "interface device" which collects data packets from the LAN which are destined for transmission over the WAN and sends those packets across the access link. The demarcation unit also receives data packets coming from the WAN across the access link and forwards those data packets to destinations on the LAN. One type of demarcation unit may be termed an ESP (Enterprise Service Point).

A network service is dependent on the amount of data it can send and receive from a source device to one or more destination devices. Therefore, the quality of a network service is dependent on the amount of network resources (such as uptime, outages, bandwidth, delay, loss, and jitter) it can utilize to transfer its data. However, in a conventional IP network, all network services share all the network resources on a first come, first serve ("best effort") basis. This may be detrimental to some network services since some services require more network resources than other services.

For example, a typical video conferencing service requires much more data to be sent than a typical e-mail service. Transmitting a video signal for a video conference requires fairly large bandwidth, short delay (or "latency"), small jitter, and reasonably small data loss ratio. An e-mail service requires far less network resources than a video conferencing service because the e-mail service often has relatively little data to send to its destinations and it is generally acceptable if an e-mail transmission is slightly delayed in transiting a network. Transmitting e-mail messages or application data can generally be done with lower bandwidth but can tolerate no data loss. Furthermore, it is not usually critical that e-mail be delivered instantly, so e-mail services can usually tolerate longer latencies and lower bandwidth than other services. In addition, the e-mail service requires only enough network resources to send data in a single direction. Conversely, the typical video conferencing service requires enough network resources to send data constantly and seamlessly in two directions. This may be required if all participants in the video conference want to see each other, and thus requires an individual's image to be sent to the other participants and the other participant's images to be received.

If the network resources are shared in a best effort fashion between these and other types of network services, the e-mail service will deliver e-mail extremely fast, but the video conferencing service would not be able to display a very clear picture. What is desired is to have a policy where the network resources utilization is weighted such that the video conferencing service receives more network resources than e-mail services.

Typically, an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application.

Again, guaranteeing the Quality of Service ("QoS") needed by applications which require low latency is typically done by dedicating end-to-end connection-oriented links to each application. This tends to result in an inefficient allocation of bandwidth. Network resources which are committed to a specific link are not readily shared, even if there are times when the link is not using all of the resources which have been allocated to it. Thus committing resources to specific end-to-end links reduces or eliminates the ability to achieve statistical gains. Statistical gains arise from the fact that it is very unlikely that every application on a network will be generating a maximum amount of network traffic at the same time.

If applications are not provided with dedicated end-to-end connections but share bandwidth, then each application can, in theory, share equally in the available bandwidth. In practice, however, the amount of bandwidth available to each application depends on things such as router configuration, the location(s) where data for each application enters the network, the speeds at which the application can generate the data that it wishes to transmit on the network and so on. The result is that bandwidth may be allocated in a manner that bears no relationship to the requirements of individual applications or to the relative importance of the applications. There are similar inequities in the latencies in the delivery of data packets over the network.

The term "Quality of Service" is used in various different ways. In general, QoS refers to a set of parameters which describe the required traffic characteristics of a data connection. The term "QoS" generally refers to a set of one or more of the following interrelated parameters which describe the way that a data connection treats data packets generated by an application:

Minimum Bandwidth—a minimum rate at which a data connection should be capable of forwarding data originating from the application. The data connection might be incapable of forwarding data at a rate faster than the minimum bandwidth but should be capable of forwarding data at a rate equal to the rate specified by the minimum bandwidth;

Maximum Delay—a maximum time taken for data from an application to completely traverse the data connection. QoS requirements are met only if data packets traverse the data connection in a time equal to or shorter than the maximum delay;

Maximum Loss—a maximum fraction of data packets from the application which may not be successfully transmitted across the data connection; and, Jitter—a measure of how much variation there is in the delay experienced by different packets from the application being transmitted across the data connection. In an ideal case, where all packets take exactly the same amount of time to traverse the data connection, the jitter is zero. Jitter may be defined, for example, as any one of various statistical measures of the width of a distribution function which expresses the probability that a packet will experience a particular delay in traversing the data connection.

Different applications require different levels of QoS.

Recent developments in core switches for WANs have made it possible to construct WANs capable of quickly and efficiently transmitting vast amounts of data. There is a need for a way to provide network users with control over the QoS provided to different data services which may be provided over the same network.

Service providers who provide access to WANs wish to provide their customers with "Service Level Agreements" rather than raw bandwidth. A Service Level Agreement is an agreement between a service provider and a customer that defines the level of service that will be provided for each particular type of application. This will permit the service providers to take advantage of statistical gain to more efficiently use the network infrastructure while maintaining levels of QoS that customers require. To do this, the service providers need a way to manage and track usage of these different services.

Applications connected to a network generate packets of data for transmission on the network. In providing different levels of service it is necessary to be able to sort or "classify" data packets from one or more applications into different classes which will be accorded different levels of service. The data packets can then be transmitted in a way which maintains the required QoS for each application. Data packets generated by one or more applications may belong to the same class.

Clearly, sharing all the network resources equally between the network services is not desired by a customer. A set of rules for allocating network resources between the various network services may be called a "policy". Policy management is meant to alleviate the uncontrolled network resources allocation between network services. The ability to configure the allocation of the network resources for the network services is called scheduling-based policy management. Scheduling-based policy management is preferred over priority-based policy management to be the policy architecture. Priority-based policy management means all data packets of a particular network service are given a priority level over all data packets of other network services. Scheduling-based policy management means that each network service is given a configurable amount of network resources over all other network services.

From time to time, it is necessary to change the policy that governs the allocation of resources to network services. It is not acceptable to shut down a router while the policy is being changed. It is usually required that any policy changes be done while packets are being processed by the router. To minimize the disruption of policy changes on packets that are currently queued in a router waiting to be forwarded, it is desirable to determine the minimum set of differences between the policy that was active before the change and the policy that will be active after the change. The router can then deploy the minimal set of changes to cause the least disruption to packets in transit through the router.

SUMMARY OF THE INVENTION

A method and apparatus is described for receiving a new policy tree at a network element in a network, comparing the classes of a current policy tree stored at the network element with the classes of the new policy tree, and selectively replacing the classes of the current policy tree with the classes of the new policy tree based on a comparison of the classes. Each policy tree includes a number of classes which designate quality of service treatment for packets belonging to each class. Thus, a method and apparatus for changing a quality of service policy tree with minimal disruption of classified packet flow is described.

BRIEF DESCRIPTION OF THE DRAWINGS

In the attached drawings which illustrate non-limiting embodiments of the invention.

DETAILED DESCRIPTION

Embodiments of the present invention may be applied in many different situations where data packets are classified, scheduled and dispatched. The following description discusses the application of the embodiments of the invention to scheduling onward transmission of data packets received at an Enterprise Service Point ("ESP") router device. Embodiments of the present invention are not limited to use in connection with ESP devices but can be applied in almost any situation where classified data packets are scheduled and dispatched.

Figure 1:
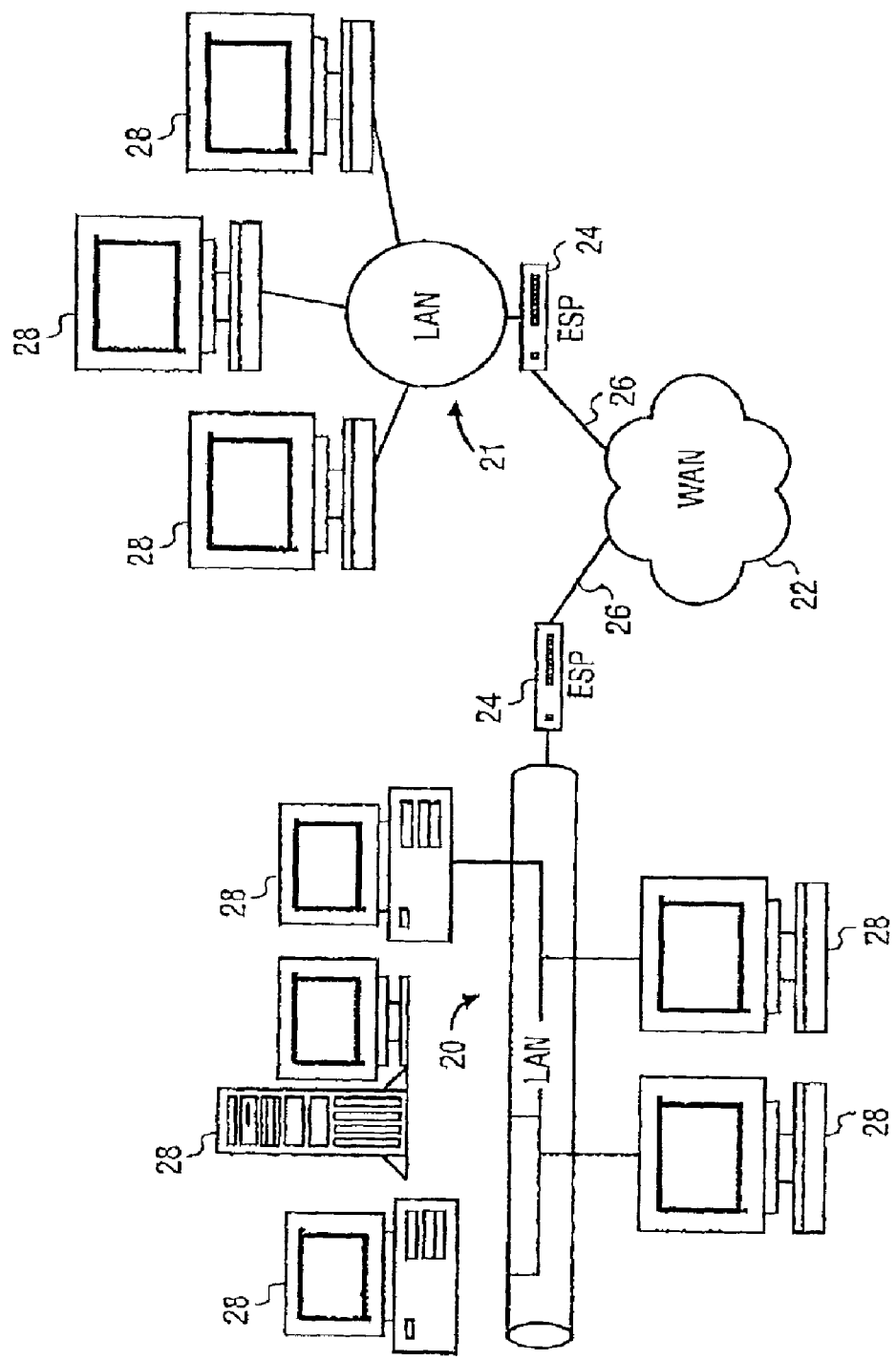
FIG. 1 is a schematic view of a wide area network which comprises enterprise service point ("ESP") router devices according to one embodiment.

FIG. 1 is a schematic view of a wide area network which comprises enterprise service point ("ESP") router devices according to one embodiment. It shows a generalized view of a pair of LANs 20, 21 connected by a WAN 22. Each LAN 20, 21 has an Enterprise Service Point unit ("ESP") 24 which connects LANs 20, 21 to WAN 22 via an access link 26. LAN 20 may, for example, be an Ethernet network, a token ring network or some other computer installation. Access link 26 may, for example, be an Asynchronous Transfer Mode ("ATM") link. Each LAN has a number of connected devices 28 which are capable of generating and/or receiving data for transmission on the LAN. Devices 28 typically include network-connected computers. Embodiments of the present invention are not limited to data communications between LANs and WANs, but can also be applied to data communications between two LANs or two WANs or any other situation where classified data packets are scheduled and dispatched.

Figure 2:
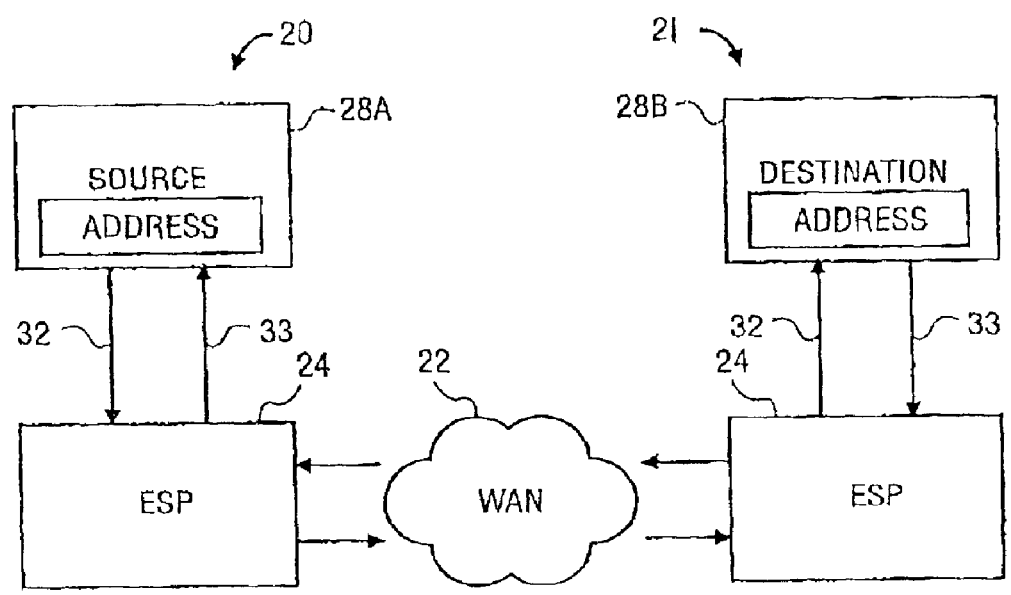
FIG. 2 is a schematic view illustrating two flows in a communications network according to one embodiment.

As required, various devices 28 on network 20 may establish data connections with devices 28 of network 21 over WAN 22 and vice versa. A single device may be running one or more applications each of which may maintain uni-directional or bi-directional connections to applications on another device 28. Each connection may be called a session. Each session comprises one or more flows. Each flow is a stream of data from a particular source to a particular destination. FIG. 2 is a schematic view illustrating two flows in a communications network according to one embodiment. It illustrates a session between a computer 28A on network 20 and a computer 28B on network 21. The session comprises two flows 32 and 33. Flow 32 originates at computer 28A and goes to computer 28B through WAN 22. Flow 33 originates at computer 28B and goes to computer 28A over WAN 22. Most typically data in a great number of flows will be passing through each ESP 24 in any period. ESP 24 manages the outgoing flow of data through at least one port and typically through each of two or more ports.

Each flow consists of a series of data packets. In general, the data packets may have different sizes. Each packet comprises a header portion which contains information about the packet and a payload or datagram. For example, the packets may be Internet protocol ("IP") packets.

Figure 3:
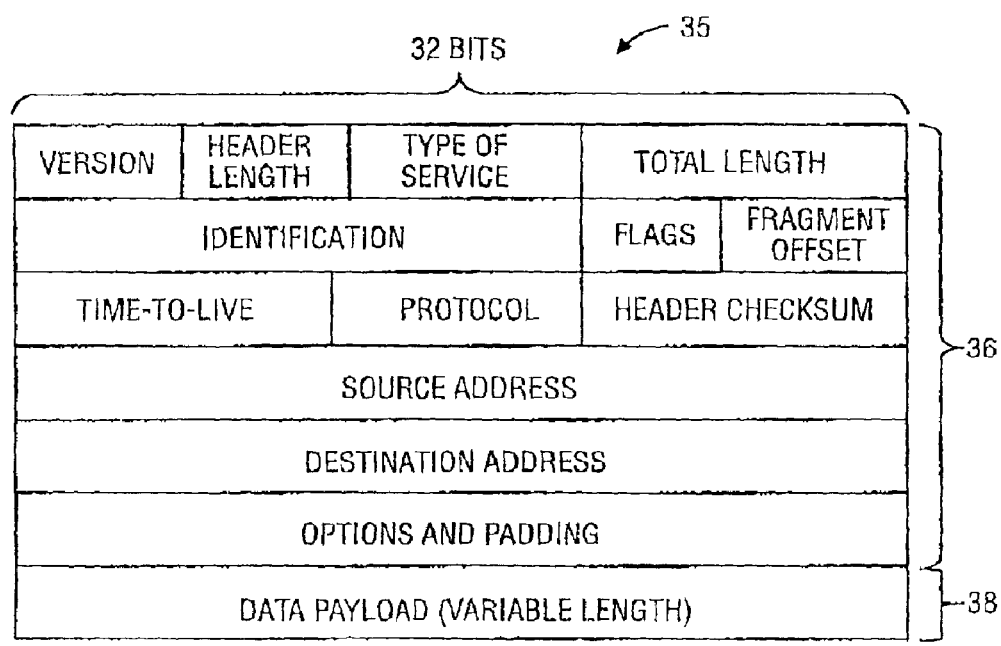
FIG. 3 is a diagram illustrating the various data fields in a prior art IP v4 data packet according to one embodiment.

FIG. 3 is a diagram illustrating the various data fields in an IP v4 data packet according to one embodiment. It illustrates the format of an IP packet 35 according to the currently implemented IP version 4. Packet 35 has a header 36 and a data payload 38. The header contains several fields. The "version" field contains an integer which identifies the version of IP being used. The current IP version is version 4. The "header length" field contains an integer which indicates the length of header 36 in 32-bit words. The "Type of Service" field contains a number which can be used to indicate a level of Quality of Service required by the packet. The "total length" field specifies the total length of packet 35. The "identification" field contains a number which identifies the data in payload 38. This field is used to assemble the fragments of a datagram which has been broken into two or more packets. The "flags" field contains 3 bits which are used to determine whether the packet can be fragmented. The "time-to-live" field contains a number which is decremented as the packet is forwarded. When this number reaches zero the packet may be discarded. The "protocol" field indicates which upper layer protocol applies to packet 35. The "header checksum" field contains a checksum which can be used to verify the integrity of header 36. The "source address" field contains the IP address of the sending node. The "destination address" field contains the IP address of the destination node. The "options" field may contain information related to packet 35.

Each ESP 24 receives streams of packets from its associated LAN and from WAN 22. These packets typically belong to at least several different flows. The combined bandwidth of the input ports of an ESP 24 is typically greater than the bandwidth of any single output port of ESP 24. Therefore, ESP 24 typically represents a queuing point where packets belonging to various flows may become backlogged while waiting to be transmitted through a port of ESP 24. Backlogs may occur at any output port of ESP 24. While one embodiment of the invention is preferably used to manage the scheduling of packets at all output ports of ESP 24, in other embodiments the invention could be used at only selective output ports of ESP 24.

For example, if the output port which connects ESP 24 to WAN 22 is backlogged, then ESP 24 should determine which packets to send over access link 26, and in which order, to make the best use of the bandwidth available in access link 26 and to provide desired levels of QoS to individual flows. To do this, ESP 24 should be able to classify each packet, as it arrives, according to certain rules. ESP 24 can then identify those packets which are to be given priority access to link 26. After the packets are classified they can be scheduled for transmission. Typically, all packets in the same flow are classified in the same class.

Incoming packets are sorted into classes according to a policy which includes a set of rules. For each class, the rules specify the properties which a data packet should possess for the data packet to belong to the class. The policy preferably also has attributes for each class establishing QoS levels for that class. Therefore, each class contains rules and attributes, where rules define the identity of the data packet and the attributes define the amount of resource access and usage to route the data packet out of the ESP 24.

As each new packet arrives at ESP 24 from LAN 20 the new packet is classified. Classification involves extracting information intrinsic to a packet such as the source address, destination address, protocol, and so on. Classification may also involve information external to the data packets such as the time of day, day of week, week of the year, special calendar date and the port at which the packet arrives at ESP 24. This information, which comprises a set of parameters for each packet, is used to classify the packet according to a set of rules. The application of rules to a given packet to determine the appropriate class is called "class identification".

If the header 36 and/or external information of a data packet satisfies the rules of a class, then the data packet is identified as the type of service the class represents. For example, consider the rule for a class representing HTTP traffic: (Source port=80) or (Destination port=80). If the source port in the header 36 in a data packet is equal to 80, then the data packet is classified as HTTP traffic.

Again, a class contains rules and attributes where: (i) rules define the identity of the data packet and (ii) the attributes define the amount of resource access and usage to route the data packet out of the ESP. Since the ESP preferably uses scheduling-based policy management, the classes in a policy will be oriented towards traffic classification. Two broad categories of traffic classification are real time and best effort. "Real time" refers to packet traffic which requires low end-to-end network delays (e.g. video conferencing). "Best effort" refers to packet traffic where the only QoS requirement is that there be a high probability that it is delivered sometime.

A group of classes represents how the data packets of a set of network services will be ordered out of a termination point, a "termination point" in this context meaning the logical representation of the termination of any transport entity such as a logical output port. This grouping of classes may be called the "TP policy" since the relation of the classes to one another requires the definition of a policy in respect of that termination point.

If the network service type of each class is completely different and with no overlap (i.e. "orthogonal") to all the others, this would create a flat organization of classes. However, classes can be refined such that classes do not have to be orthogonal to each other. For example, a class specifying a range of source and destination addresses can be refined by a class specifying a narrower range of source and destination addresses. Since classes can be refined, the class organization becomes a tree hierarchy (called a "policy tree") rather than a flat organization.

Figure 4:
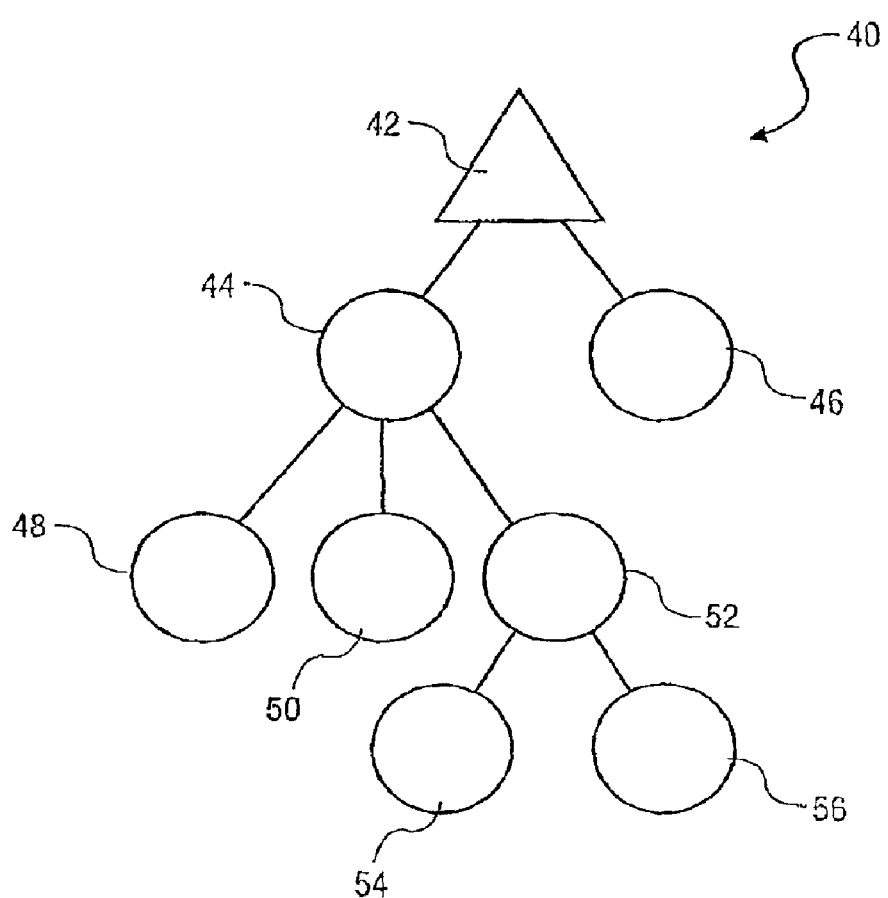
FIG. 4 is a schematic diagram illustrating the structure of a possible policy tree according to one embodiment.

FIG. 4 is a schematic diagram illustrating the structure of a possible policy tree according to one embodiment. It schematically illustrates a typical policy tree 40. The root of the tree hierarchy is the TP policy 42 (typically represented by a triangle) and the nodes of the tree are classes 44, 46, 48, 50, 52, 54, 56 (each typically represented by a circle). The leaves (i.e. nodes having no children) of the tree hierarchy are classes that are orthogonal to all the other leaf classes. For example, in FIG. 4, according to one embodiment, the leaf classes 46, 48, 50, 54, 56 are orthogonal to one another. Furthermore, each class in a particular level or layer of the policy tree will be orthogonal to all other classes in that particular level or layer. In FIG. 4, according to one embodiment, classes 44 and 46 in the first layer are orthogonal to each other, classes 48, 50, 52 in the second layer are orthogonal to one another, and classes 54 and 56 in the third layer are orthogonal to each other.

Each of the classes in a typical TP policy contains the name of the class, the type of the service, and the amount of bandwidth it uses. Note that for best effort classes a percentage of the bandwidth is specified in one embodiment, whereas for real time classes a numerical value is used in one embodiment. This is because real time classes in one embodiment should specify the maximum amount of bandwidth, whereas best effort classes should specify the minimum amount of bandwidth.

Figure 5:
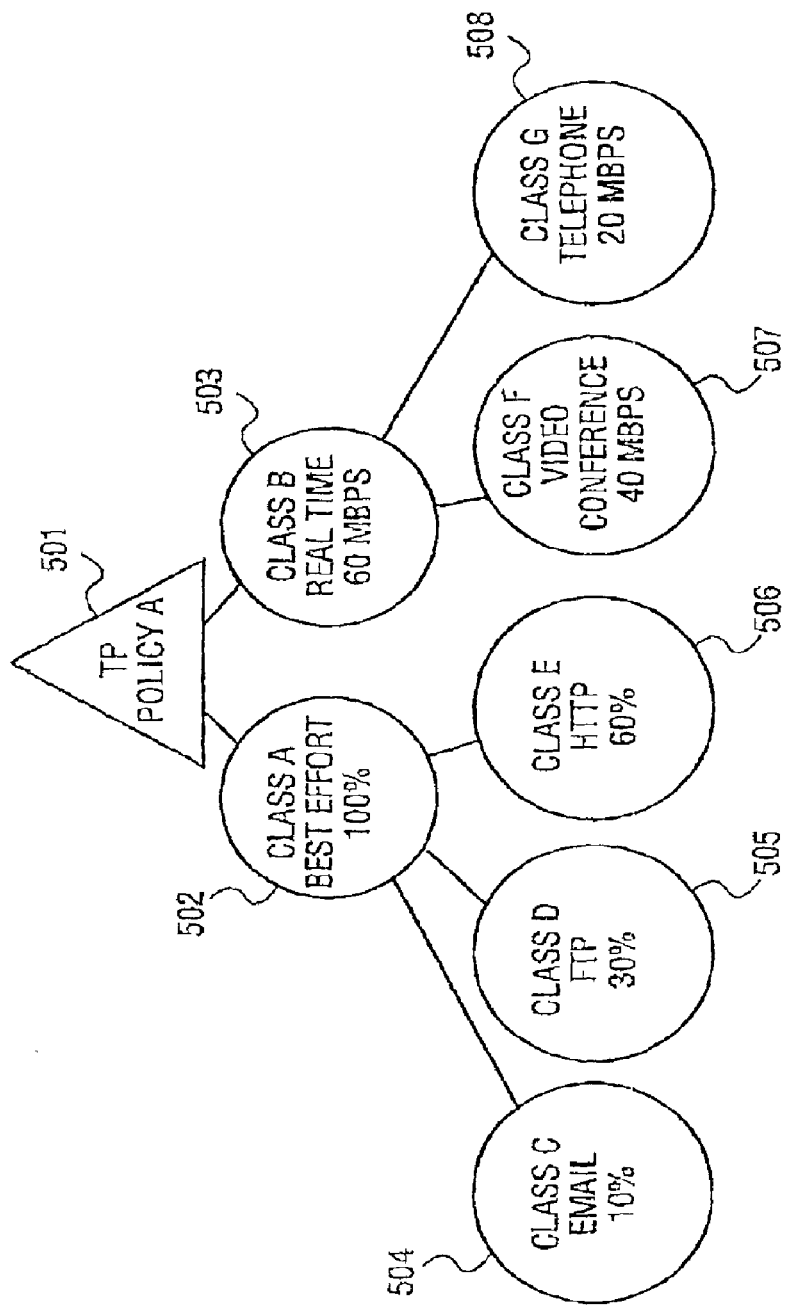
FIG. 5 is a schematic diagram illustrating an example of a possible policy tree according to one embodiment.

FIG. 5 is a schematic diagram illustrating an example of a possible policy tree according to one embodiment. It schematically illustrates a specific example of a policy tree in practice. It is important to note that a class will in one embodiment refine its parent's rules and attributes. In FIG. 5, for example, policy tree A (501) has Classes 502, 503, 504, 505, 506, 507, and 508. Class A (502) is a parent of Classes C (504), D (505), and E (506). Class B (503) is a parent of Classes F (507) and G (508). A class cannot provide rules or attributes that break its parent's set of rules and attributes. Each class in a policy tree can be thought of as containing its own attributes and rules and virtually its parent's attributes and rules. This has a recursive effect such that a class has all the attributes and rules of its parent and its parent's parent all the way up to the root of the policy tree. This notion is called "inheritance". A class inherits all of its parent class's attributes and rules up to but not including the root of the policy tree. For example, in FIG. 5, Class F (507) inherits all of its parent Class B's (503) attributes and rules. So Class F (507) inherits Class B's (503) available 60 Mbps, but limits that amount by its own rules to 40 Mbps. It can be seen that in this example Class G (508) inherits the remaining available 20 Mbps of its parent Class B's (503) 60 Mbps, the other 40 Mbps having been inherited by Class F (507). Neither Class F (507) nor Class G (508) in this example could provide a rule allowing more than 60 Mbps, because this would violate the 60 Mbps rule of parent Class B (503). No class inherits from root TP Policy A (501), as this is the root of the policy tree.

Figure 6:
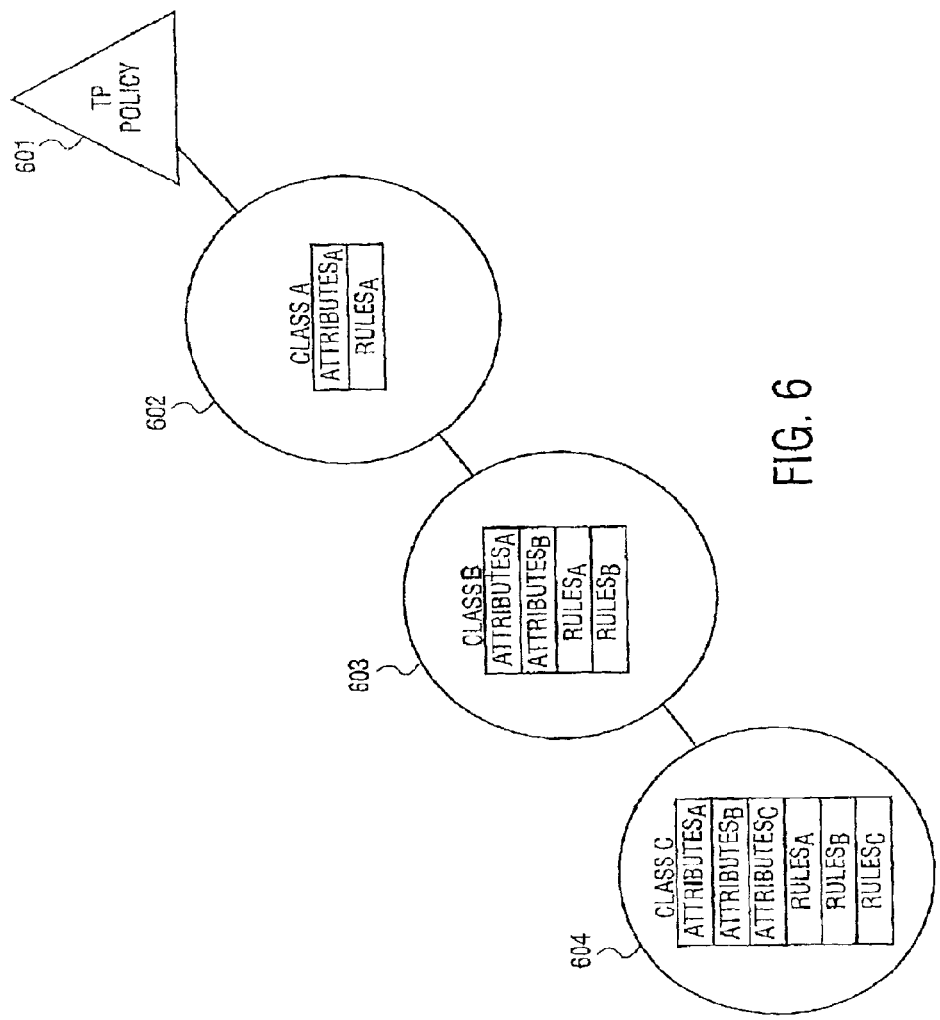
FIG. 6 is a schematic diagram illustrating the inheritance nature of classes in a policy tree according to one embodiment.

FIG. 6 is a schematic diagram illustrating the inheritance nature of classes in a policy tree according to one embodiment. As illustrated in FIG. 6, according to one embodiment, class B (603) inherits all the attributes and rules of class A (602). Class C (604) inherits all the attributes and rules of class B (603), which implies that class C (604) also inherits all the attributes and rules of class A (602). Thus, inheritance according to one embodiment is multiple and transitive in nature.

Figure 7A:
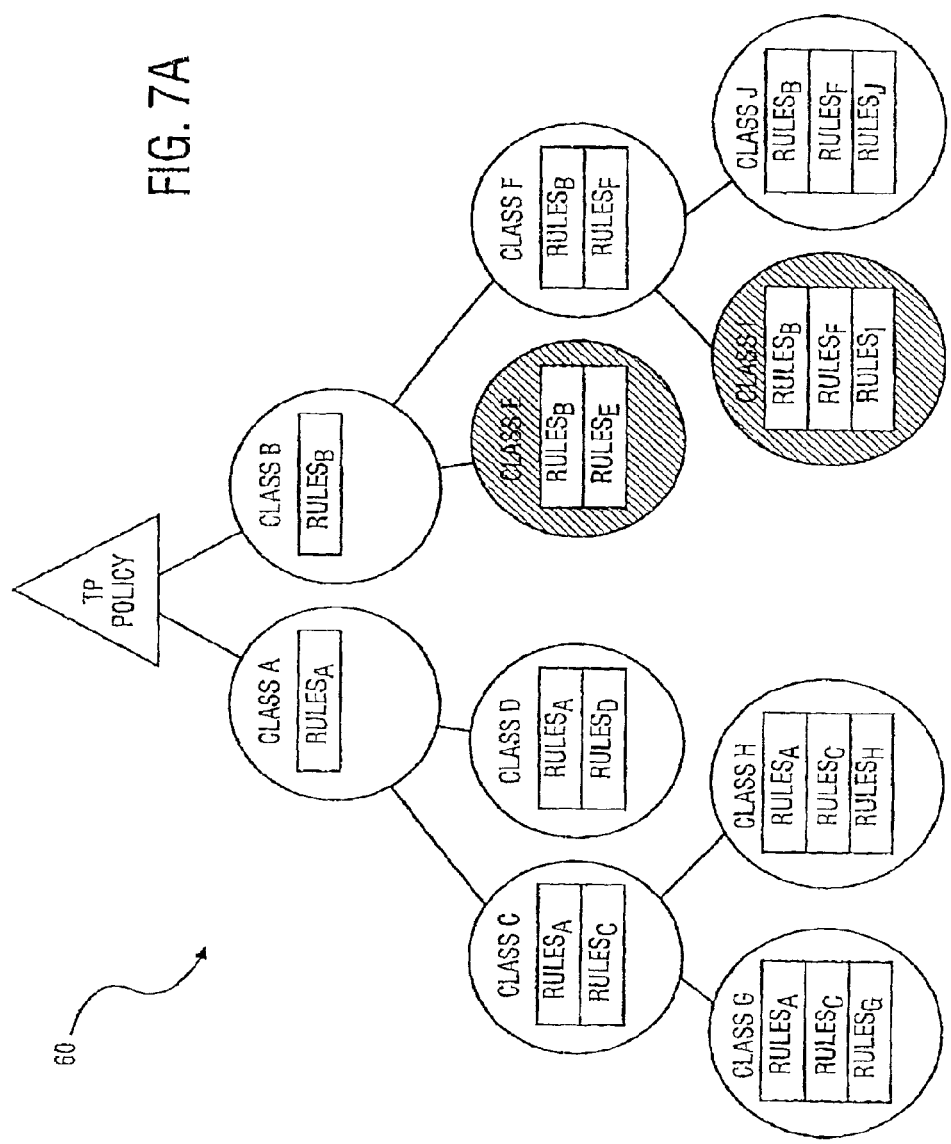
FIGS. 7A and 7B are schematic diagrams illustrating the mapping between a logical policy tree and its compiled or collapsed equivalent according to one embodiment.
Figure 7B:
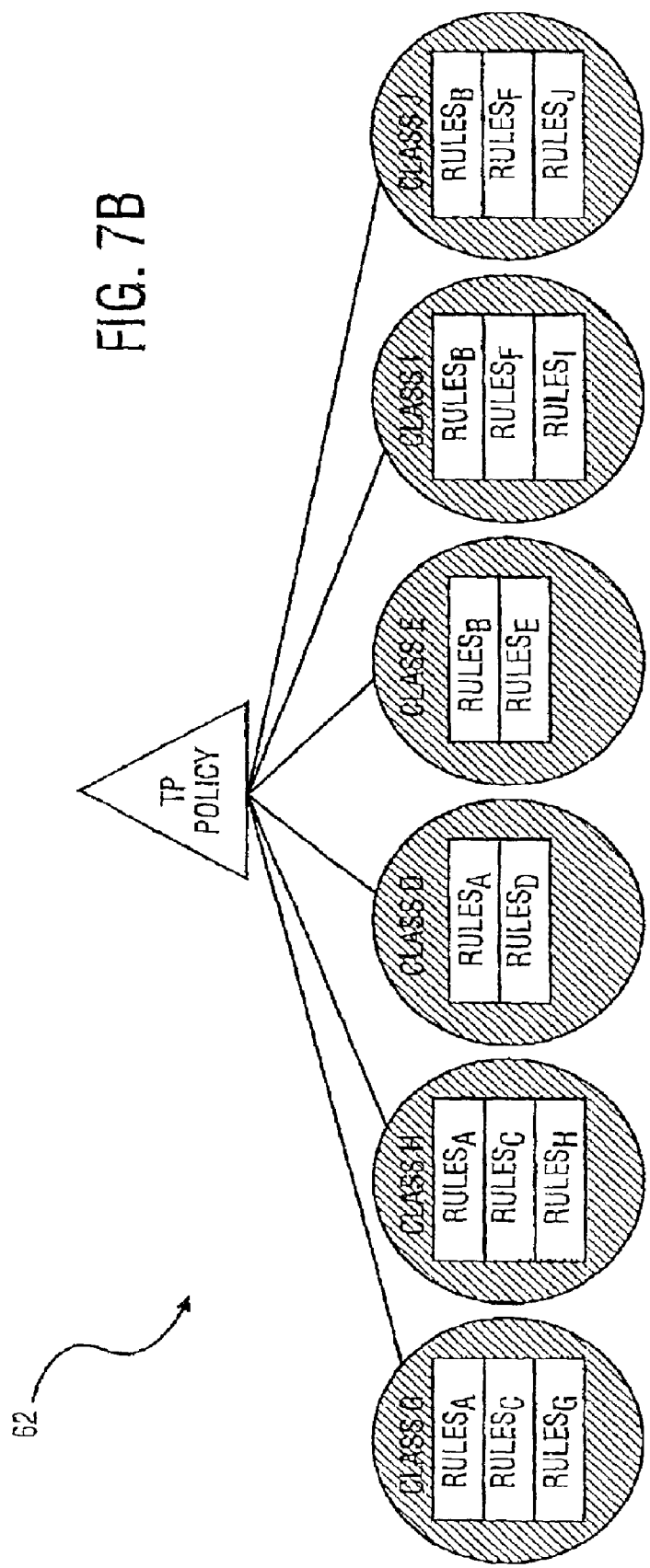

The component within the ESP 24 that identifies the data packets as they flow through the ESP 24 is the class identifier. The class identifier may classify packets by using a logical lookup table called the "class lookup table" or "CLT" to identify the type of a data packet and map it to a class ID generated from the policy tree. In order to map the class identification of a policy tree to the CLT, the logical view of the policy tree is "collapsed" or "compiled" into a flat structure. Only classes that do not have children in the logical view will exist in the compiled view. These classes will contain all the rules required for the CLT. FIGS. 7A and 7B are schematic diagrams illustrating the mapping between a logical policy tree and its compiled or collapsed equivalent according to one embodiment. In FIG. 7A, according to one embodiment, it can be seen that policy tree 60 can logically be compiled into the policy tree 62 of FIG. 7B, and that policy tree 62 is the flat-structure logical equivalent of policy tree 60.

Each class in the policy tree represents a specific type of network service and how much network resources will be allocated to its data packets; in other words, each class defines a level of QoS to be assigned to data packets in that class. The data packets are placed into queues and "flows" that correspond to a leaf class in the policy tree. A single flow corresponds to a particular session (such as a TCP/IP session). A flow may also be considered a grouping of packets that belong to the same flow of traffic between two end points in a session. There are a configurable number of flows within each class.

Figure 8:
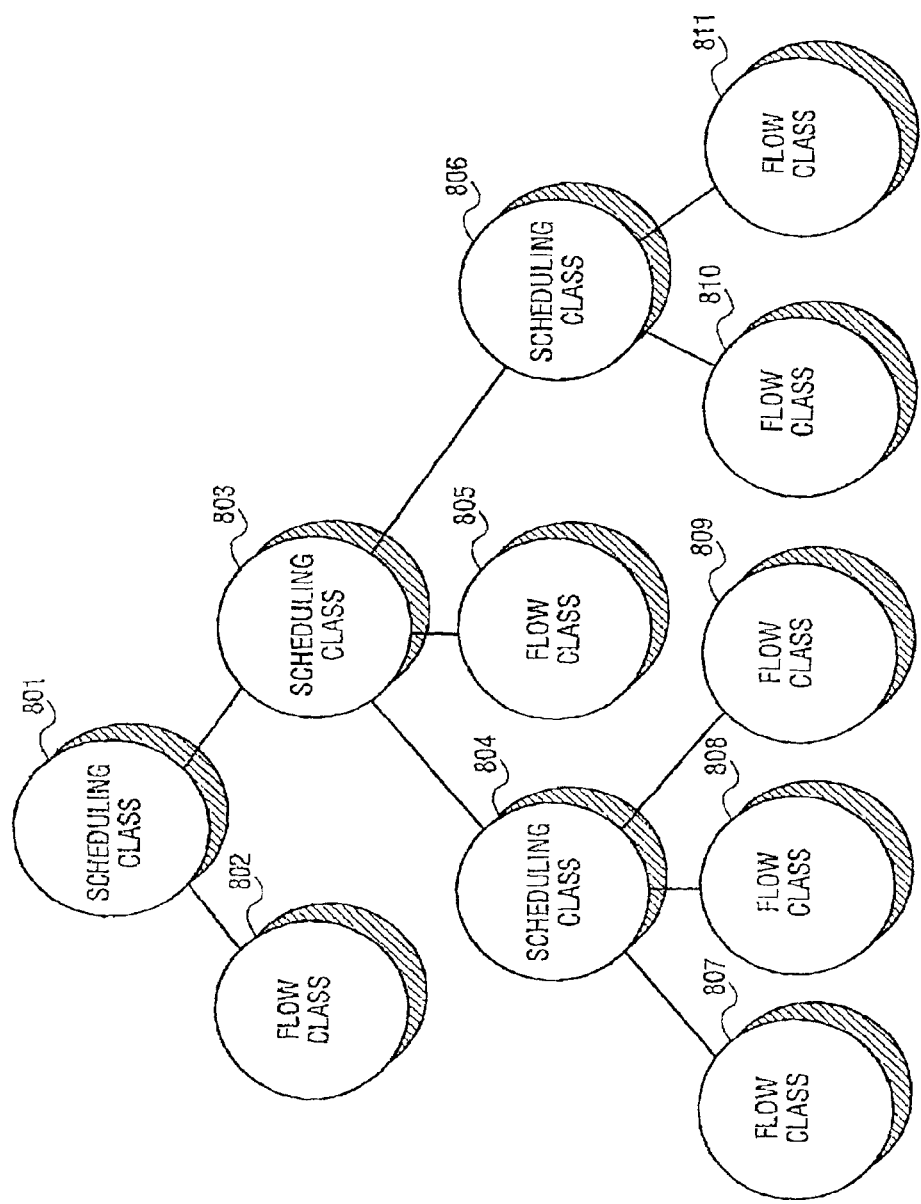
FIG. 8 is a schematic diagram illustrating scheduling classes and flow classes in a policy tree according to one embodiment.

From a logical point of view, there can be a naming convention of classes that map to the physical point of view. For example, a class that has no children may be called a "flow class" because it logically contains the flows where packets are queued. A class that has children is called a "scheduling class" because these classes define how the packets will be scheduled out of the termination point. FIG. 8 is a schematic diagram illustrating scheduling classes and flow classes in a policy tree according to one embodiment. It depicts a class sub-tree where each leaf class is labelled as a flow class and each non-leaf class is labelled as a scheduling class. Thus, in this example, leaf classes 802, 805, 807, 808, 809, 810, and 811 are labelled Flow Classes. In this example, non-leaf classes 801, 803, 804, and 806 are labelled Scheduling Classes. The difference between flow classes and scheduling classes is also illustrated in FIGS. 7A and 7B, according to one embodiment; it can be seen in FIG. 7B, according to one embodiment that the compiled policy tree 62 that is ultimately used by the class identifier consists solely of flow classes, and that the scheduling classes in the equivalent uncompiled policy tree 60 of FIG. 7A are merely for directing the data packet to the proper flow class.

Each scheduling class will in one embodiment have at least two children classes, one of which should in one embodiment be a flow class called the "default sibling class", which holds the flows that match the parent class but none of the other sibling classes. In mathematical terms, the default sibling class is the "logical not" of all the other sibling classes. Every TP policy will have at least one default class, which will be a best effort class that will be equivalent to the conventional method of managing traffic (i.e. forward the traffic as best you can with no specific QoS guarantees).

The properties of a flow class will be different than the properties of a scheduling class. Specifically, the properties of a flow class will deal with scheduling as well as flow information (for example, how many flows are allowed and how many data packets can be queued in a single flow). The properties of a scheduling class deal only with how to schedule data packets out of the termination point (for example, the bandwidth distribution).

Figure 9:
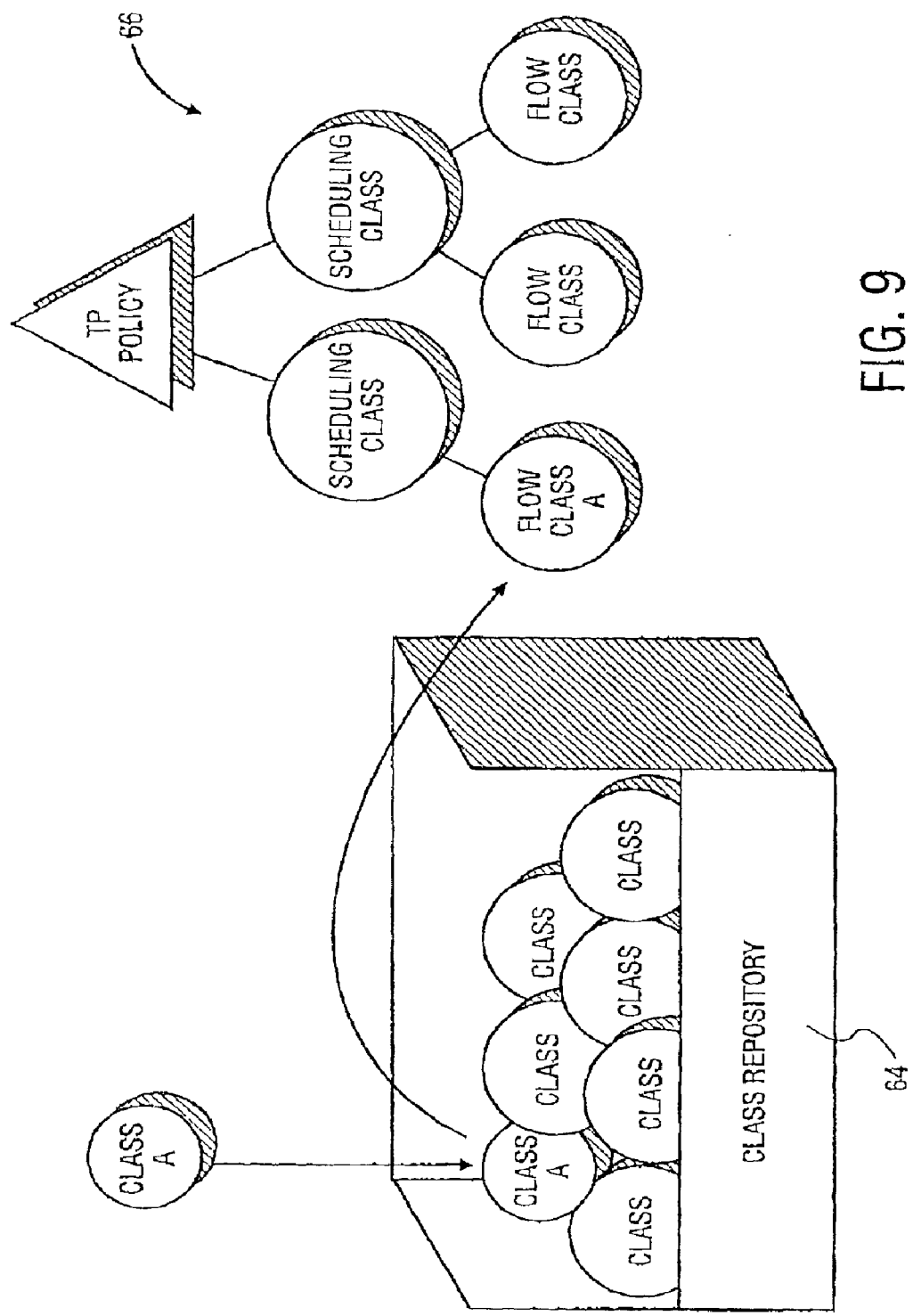
FIG. 9 is a schematic diagram illustrating how a class is defined and placed in a class repository and later copied into a policy tree according to one embodiment.

Classes are editable when created. After all modifications to a class are completed, the class should be "committed", meaning it is verified and saved. Users can create and store classes and class sub-trees in a "class repository", which can be thought of as a logical storage facility for classes and class sub-trees. Classes may then later be copied from the class repository and placed in a policy tree. The class repository is a useful tool for efficient policy tree creation and modification. It allows developers of graphical user interfaces to create "drag and drop" functionality. FIG. 9 is a schematic diagram illustrating how a class is defined and placed in a class repository and later copied into a policy tree according to one embodiment. It schematically illustrates how a leaf Class A is defined and placed in a class repository 64, and then later copied into a policy tree 66.

A TP policy within an ESP 24 is defined in the context of the component that sends data packets out, namely, a logical output port. For each ESP 24, there are typically multiple logical output ports. A single logical output port is associated with a single termination point and TP policy. In turn, a TP policy is defined in terms of a policy tree of classes that are logically associated with a termination point to schedule packet traffic flowing out through an output port. The following are types of logical output ports that an embodiment of the ESP 24 might handle:

Ethernet (4 physical ports treated as 4 logical output ports)

T1/E1 or voice over IP card (2 physical ports creating 48 voice channels but treated as a single logical output port)

ATM (4 T1s connected to 4 physical ports treated as up to 256 logical ports, one for each virtual circuit)

Since in one embodiment Ethernet card has four logical ports, the voice over IP card has essentially 1 port and the ATM card has up to 256 logical ports, there are typically at most 261 TP policies being used in a current embodiment of the ESP 24 which is configured in this manner at any particular moment. A voice over IP card is a special case for policy management since it only deals with real time voice traffic. In this case, the voice over IP logical output port will have only one real time class in the policy tree. The fact that policies are associated only with the output port implies that a policy can be associated with the outgoing flow of data packets from any of (1) LAN to WAN; (2) WAN to LAN; (3) LAN to LAN; and (4) WAN to WAN.

Preferably there is in one embodiment a default TP policy that is used when no TP policy is associated with a logical output port. The default TP policy contains only the default class, which is a best effort class (i.e. matches all traffic, and at most specifies an arbitrary amount of bandwidth to handle the traffic).

Each class should be verified with respect to all other classes within a TP policy so that there are no conflicts when the TP policy is in-service. Further, each TP policy put into service should be verified against all other TP policies that will be in service at the same time. Consequently, all classes in all TP policies that are put into service should be verified against each other to ensure that there are no conflicts in the CLT. This is required to prevent conflicts when the class identifier component decides which logical output port a data packet should go out of. For example, suppose two classes in two separate TP policies has a single rule:

"source IP address=111.111.111.111/16"

This would mean that the CLT would have two entries in it with the same rule. Therefore, the class identifier component of the ESP would not know which logical output port the data packets with "source IP address=111.111.111.111/16" should go out of. From this example, it can be seen that all classes within all TP policies should be verified against each other to confirm that the CLT is free of unresolvable conflict. Furthermore, it should also be confirmed that the information given to the flow identifier and traffic manager components should also be free of conflicts.

Figure 10:
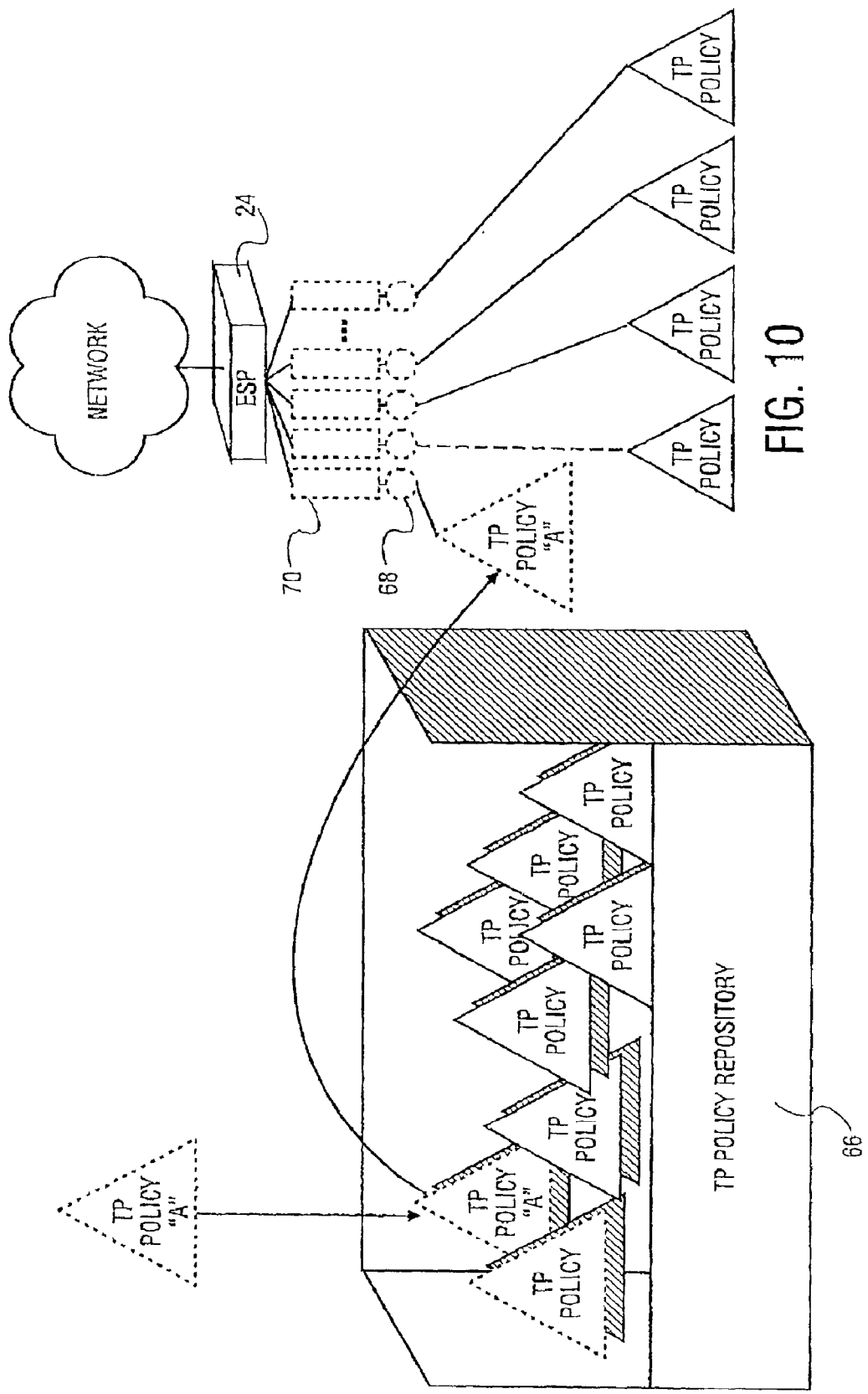
FIG. 10 is a schematic diagram illustrating how a policy is defined and placed in a policy repository and later activated at a termination point according to one embodiment.

Like individual classes, each TP policy can be created, edited, committed (verified and saved), stored in a TP policy repository, and then put into service at a termination point. FIG. 10 is a schematic diagram illustrating how a policy is defined and placed in a policy repository and later activated at a termination point according to one embodiment. In FIG. 10, according to one embodiment, a TP policy "A" is created, edited, committed, and stored in a TP repository 66. Once a TP policy has been committed, it can be put into service by "activating" it. Activating a TP policy means associating it to a termination point. In FIG. 10, according to one embodiment, a TP policy in the TP policy repository 66 is activated by associating it with a termination point 68, which in this case is an output port 70 of the ESP 24.

Figure 11:
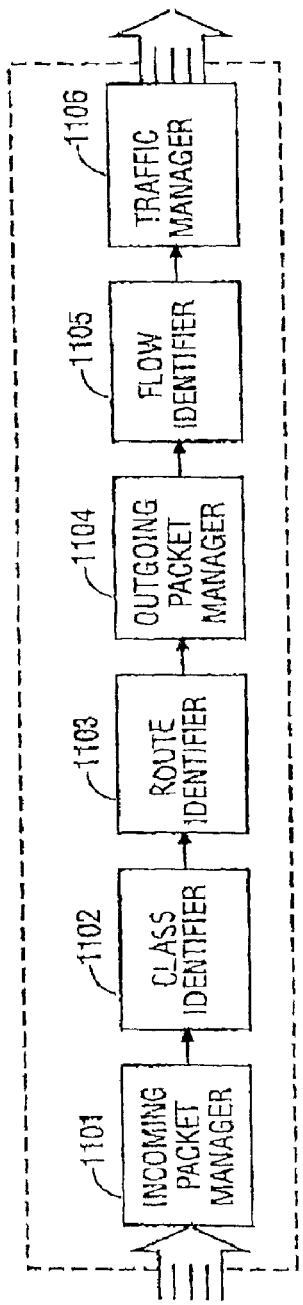
FIG. 11 is a schematic diagram of a logical pipeline illustrating how a data packet is processed according to one embodiment.

The ESP 24, has a set of components that process data packets. This set of components is commonly referred to as the "logical packet processing pipeline" (or just "pipeline"). FIG. 11 is a schematic diagram of a logical pipeline illustrating how a data packet is processed according to one embodiment. As shown in FIG. 11, according to one embodiment, an ESP may have six logical components that handle packet processing:

(1) Incoming Packet Manager ("IPM") 1101: This component uses part of the information in a packet's header 36 to determine the next hop.

(2) Class Identifier ("CI") 1102: This component classifies data packets using the TP policy information.

(3) Route Identifier ("RI") 1103: This component determines which logical output port data packets will go out on.

(4) Outgoing Packet Manager ("OPM") 1104: This component physically stores data packets on the ESP 24 for outgoing purposes.

(5) Flow Identifier ("FI") 1105: This component identifies the flow to which a data packet belongs.

(6) Traffic Manager ("TM") 1106: This component uses the flow identifier results and the TP policy to schedule packets out of logical output ports.

In FIG. 11, according to one embodiment, the components affected by policy management are the Incoming Packet Manager 1101, Class Identifier 1103, Flow Identifier 1105, and Traffic Manager 1106. In particular, TP policies affect the following:

tables used by the IPM (incoming IP packet processing);
the CLT used by the CI (incoming IP packet processing);
the flow tables used by the FI (outgoing IP packet processing); and
the traffic management tables used by the TM (outgoing IP packet processing).

Figure 12:
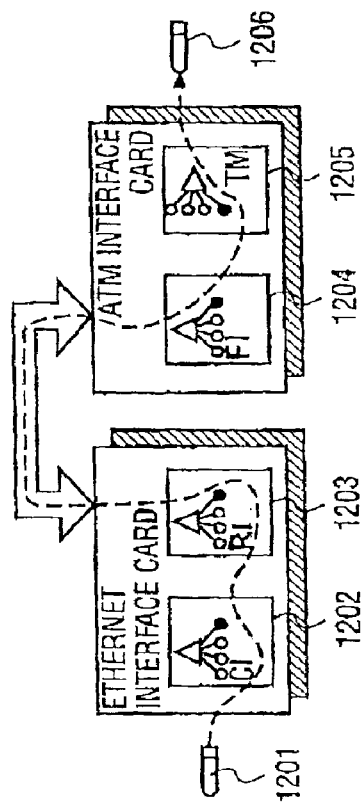
FIG. 12 is a schematic diagram illustrating how a policy is applied to both incoming and outgoing packets according to one embodiment.

FIG. 12 is a schematic diagram illustrating how a policy is applied to both incoming and outgoing packets according to one embodiment. It illustrates more clearly how a TP policy is applied to both incoming and outgoing data packets. In the example in FIG. 12, according to one embodiment: At process 1201, a data packet arrives into the Ethernet Interface Card ("EIC") from the LAN 20; At process 1202, the CI on the EIC classifies the data packet using the compiled policy tree's identification information;
At process 1203, the RI on the EIC determines using the TP policy information the logical output port on which the data packet goes out; At process 1204, the FI on the ATM Interface Card (AIC) determines the flow to which the data packet belongs using the compiled policy tree's property or attribute information; At process 1205, the TM on the AIC schedules the transmission of the data packet using the policy tree property information; and at process 1206, the data packet leaves the AIC to the WAN 22.

Figure 13:
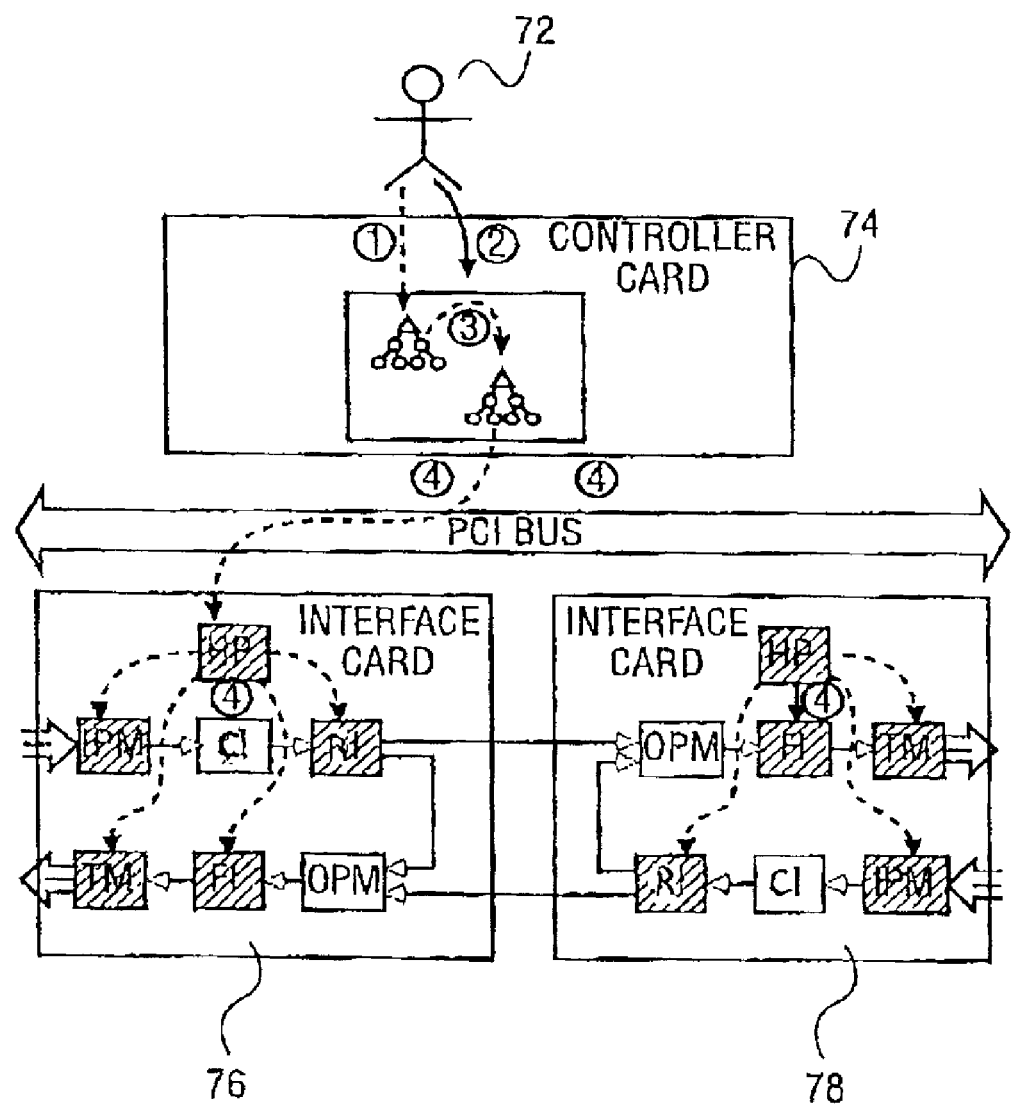
FIG. 13 is a schematic diagram illustrating the organization of logical pipeline components within an ESP according to one embodiment.

The TP policy information should be distributed to the pipeline components affected by policy management. To help illustrate how to distribute the information to the pipeline components, the following is a description of the ESP 24 architecture. FIG. 13 is a schematic diagram illustrating the organization of logical pipeline components within an ESP according to one embodiment. It illustrates the organization of these logical pipeline components within the ESP 24. FIG. 13, according to one embodiment shows that the logical packet processing components are distributed among different cards, including main controller card 74 and interface cards 76, 78. It also shows the propagation of policy information from a policy designer 72 to the particular logical packet processing components within the ESP 24, as follows:.

(1) the TP policy designer 72 creates and commits a TP policy;
(2) the TP policy is put into service;
(3) the TP policy is processed;
(4) the processed TP policy results are distributed to the interface cards 76 and 78.

All cards contain a host processor ("HP") where some form of element policy management will be done. The HP on the main controller card 74 manages the logical element policy functionality provided to users. It also processes the logical TP policies to an intermediate form and propagates the results to the HPs on the interface cards 76 and 78. Specifically, the HP on the main controller card 74:

(1) compiles the policy tree and generates the logical CLT that the CI requires (since all interface cards require the CLT, the CLT is propagated to all interface cards 76 and 78);

(2) using the association of each TP policy with a termination point, generates the required table for RI for the next hop lookup based on the class ID (since all interface cards require this table, it is propagated to all interface cards 76 and 78); and (3) using the flow and scheduling class property information, creates a list of flow identifier and scheduling update commands to incrementally change the flow tables and traffic manager tables (since not all the interface cards require the same information, the HP on the controller card determines which update commands should be propagated to a particular interface card).

TP policy changes should be distributed to the output-processing element on the affected output interface card and to the input-processing elements of all input interface cards. All input interface cards are affected by a TP policy change because the class identifier uses the TP policy information to classify incoming packets into specific service classes. The scheduling engine uses this same policy to map packets into flows and to schedule packets. The HP on the interface cards manages and propagates the processed policy information to the CI, IPM, FI and TM. Specifically, the HP on the interface cards will do the following:

apply the appropriate table to the IPM and CI;
implement the appropriate update commands to incrementally change the flow tables managed by the FI; and implement the appropriate update commands to incrementally change the traffic management tables managed by the TM.

Proper operation of the ESP 24 requires synchronizing the policy changes to the input and output-processing elements to minimize the impact of policy changes to traffic running through the ESP 24. To accomplish this goal, the ESP 24 supports incremental updates to its policies. Incremental updates to policies imply an inherent latency in completing a policy change. Although allowing abrupt policy change can reduce this inherent latency to near zero time, the traffic impact becomes less predictable. It may be unavoidably necessary to discard large numbers of packets. By using incremental policy updates, the ESP 24 balances the need to minimize traffic impacts caused by policy changes with reducing the latency needed to complete a policy change. The changes should preferably be applied to the various pipeline engine tables in a specific order.

Figures 14, 15:
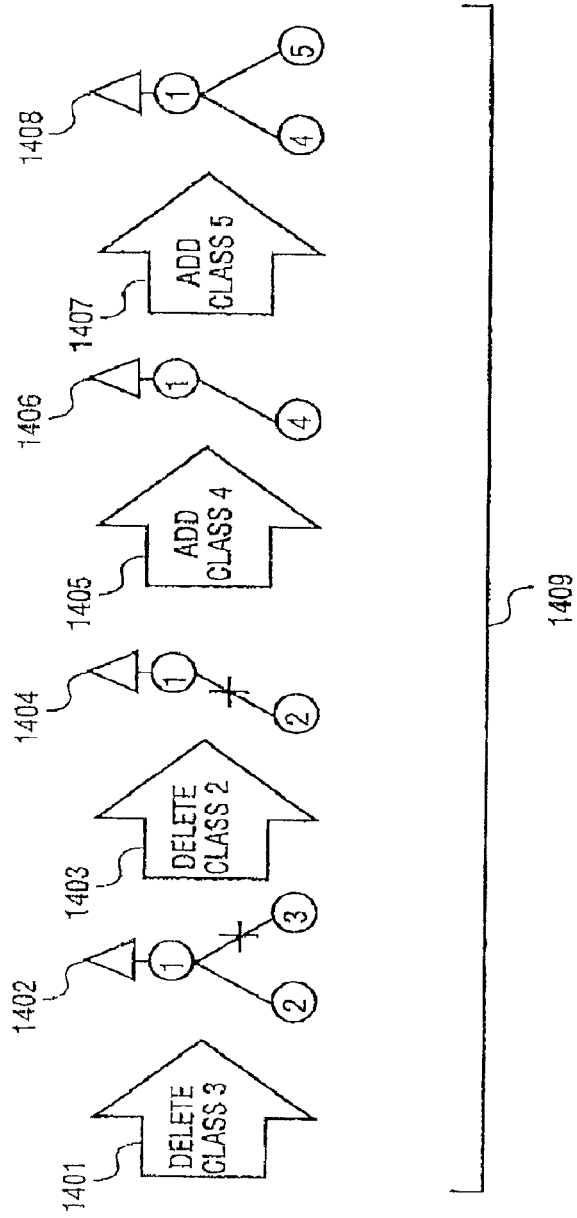
FIG. 14 is a schematic diagram illustrating how a policy can be put into service over an existing policy using incremental changes according to one embodiment.
FIG. 15 is a diagram of a classification bit mask according to one embodiment.

In an embodiment, when a class is deleted, the affected tables are updated in the following order: (i) classification tables; (ii) flow tables; and (iii) traffic management tables. In one embodiment, when a class is added, the affected tables are updated in the following order: (i) traffic management tables; (ii) flow tables; and (iii) classification tables. The order that tables are updated in response to class attribute (such as bandwidth or flow limit) changes depend on the specific attributes being changed. During an incremental change, a TP policy may go through an intermediate transitory period when the TP policy is not valid. The ESP 24 structures its incremental changes to minimize the traffic impacts caused by these transitory TP policies. FIG. 14 is a schematic diagram illustrating how a policy can be put into service over an existing policy using incremental changes according to one embodiment. FIG. 14, according to one embodiment shows that to put this particular new TP policy into service, a sequence of incremental changes, 1401, 1403, 1405, and 1407 should be done. It can be seen in FIG. 14, for example, that in incremental change 1401, class 3 is deleted, and this deletion is reflected in policy tree 1402. Then in incremental change 1403, class 2 is deleted, and this deletion is reflected in policy tree 1404. Next, in incremental change 1405, class 4 is added, and this addition is reflected in policy tree 1406. Finally, in incremental change 1407, class 5 is added, and this addition is reflected in policy tree 1408. The period of time to perform the entire sequence of changes is called the activation latency 1409.

In one embodiment, the following processes are employed to activate a TP policy:

(1) create the tables required for the CI and IPM;

(2) differentiate between the classes that are currently in service with the classes that will be put into service to create a list of FI and TM update commands;

(3) distribute and synchronize the deleted classes by applying the tables and the "delete" commands;

(4) distribute and synchronize the added classes by applying the tables and the "add" commands; and (5) distribute and synchronize the modified classes by applying the tables and the "modify" commands.

As discussed above, a TP policy that is put into service should be verified against all currently in-service TP policies. In addition, a TP policy that will be put into service at a pre-determined time in the future should be verified against all TP policies that will be in-service at the same time. The action of putting a TP policy into service at a pre-determined time in the future is called "scheduling". The history of the times when TP policies went into service combined with statistics can provide useful information to determine which TP policies work well together during certain periods of time. For example, statistics may provide information that the traffic flow during Monday evenings were badly congested due to the TP policies, but the traffic flow during Tuesday evenings were fine. A check from the TP policy history could show that there were different TP policies active during Monday evenings than during Tuesday evenings. The Tuesday evening TP policies could then be used on Monday evenings to see if the traffic flow in Mondays improves.

The typical life cycle of a policy is as follows:

(1) one or more classes are created according to the expected type of network services routed through the ESP 24;

(2) one or more TP policies are created using new or existing classes and/or class sub-trees;

(3) one or more TP policies are manually put into service;

(4) another TP policy may be put into service manually or automatically (through a scheduling mechanism); and (5) a class or TP policy may be deleted only if it is not associated with an in-service TP policy.

Preferred embodiments of the invention may include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

Policy Change Characterization

The following describes a specific policy change characterization method and apparatus according to one embodiment. An ESP according to a currently preferred embodiment of the invention uses policies to control how packets are forwarded out each of its output logical ports. Each output logical port has its own policy. A policy consists of a tree of classes.

Each class identifies a subset of packets passing through the ESP and specifies the treatment to be provided to those packets. Treatment may include one or more of QoS (e.g. bandwidth, delay, jitter, reliability), security (e.g. encryption), admission control (i.e. how many data connections will be allowed), and other types of packet forwarding treatment.

A class identifies a subset of packets using one or more classification rules. A classification rule consists of one or more rule terms. In one embodiment, each rule term consists of two parts: the identity of a data item and a set of constant values. A data item may be a field in a received packet. A data item may be a value from the environment in which the packet was received (e.g. date and time when the packet was received, the input data link port through which the packet was received). The set of constant values can contain individual values, ranges of constant values, and, in the case of IP addresses, IP subnets expressed in CIDR notation. CIDR notation expresses an IP subnet as A.B.C.D/E where A.B.C.D is an IP address and /E indicates the number of leading bits that identify the subnet portion of the IP address. The remaining bits (32-E) is the host portion of the IP address. It is common practice to specify all legal host IP addresses in an IP subnet using CIDR notation with the host portion of the IP address set to 0. For example, 192.168.1.0/24 indicates the IP subnet that includes IP addresses 192.168.1.0 through 192.168.1.255.

The data items supported may include, for example:

Source IP address (received packet's IP header)

Destination IP address (received packet's IP header)

TCP or UDP source port (received packet's TCP or UDP header)

TCP or UDP destination port (received packet's TCP or UDP header)

ESP input logical port (i.e. input data link port) (environment)

Type Of Service (TOS) byte (aka Differentiated Services (DS) byte) (received packet's IP header)

Protocol (received packet's IP header)

TCP Ack Flag (received packet's TCP header)

Additional data items may also be supported. All techniques described in this document are applicable to classification schemes supporting a different set of data items.

Each type of data item may be termed a classification dimension. A rule term is allowed to be missing from a classification rule for any of the classification dimensions. A missing rule term is equivalent to a rule term that specifies the full legal range of values for the data item i.e. it specifies a wild card or don't care dimension for the class.

When a packet is received, classification rules are evaluated to classify the packet. If the value of the data item matches any of the constant values specified in a rule term, the rule term is considered to be satisfied. If all of the rule terms of a classification rule are satisfied, the classification rule is satisfied. If a rule is satisfied, the packet is considered to belong to the class to which the rule corresponds.

It is usually an error for two or more rules from different classes to be satisfied by a single packet. Policy validation prevents this from occurring except in certain restricted circumstances.

As mentioned above a policy consists of a tree of classes. In an embodiment, packet classification takes place in the lowest (leaf) classes. Packets can be viewed as entering the policy tree at the leaf class level. Packets percolate upwards through the tree until they reach the root of the tree. The root of the tree is associated with the data link attached to the output logical port. Packets leave the tree by being transmitted on the data link.

Each class in the tree can specify treatment of packets. For example, each class will generally specify bandwidth. The bandwidth of each parent class should be equal to or greater than the sum of the bandwidth of all child classes. The root of the tree corresponds to the bandwidth of the data link. This allows the data link's bandwidth to be segregated amongst classes of packets.

Although, in one embodiment, packet classification only takes place at the leaf class level, classification rules can be specified in higher classes. This is a convenience feature that provides a shorthand way of specifying common rules at higher levels of the tree.

If both a child class and its parent class contain rules, the rules in the child class should match a subset of the packets that the rules in the parent class match. In other words, the child class rules should restrict or limit the parent class rules.

The actual classification rules used in a leaf class are generated via rule compilation. Starting at the top of the class tree, rules are merged downwards to the leaf classes. The resulting merged rules are transformed into data structures that control the packet processing pipeline.

The packet processing pipeline will generally have packets queued for transmission on a data link. There are queues and waiting packets associated with each policy leaf class. New policies may be activated while the ESP is processing packets. When a new policy is activated, the new policy's class tree structure, classification rules, and packet treatment may be different from those of an existing policy. To put the new policy into effect the ESP may need to delete queues, add queues, reassign queues to various leaf classes during the transition from the old policy to the new policy.

Given the disruption that can occur, it is highly desirable to minimize the amount of change in the packet processing pipeline. Since policy changes normally only involve one or two classes out of potentially many classes, embodiments minimize the amount of disruption if the unchanged classes can be identified.

As it turns out, changes in packet treatment can be accommodated without much disruption. It is classification rule changes and class tree structure changes that cause the most disruption in the packet processing pipeline.

This invention in one embodiment provides a strategy for determining the difference between two policies. The differentiation process is used to determine the minimum number of changes that are required to replace an old policy with a new policy.

Policies

In one embodiment, a class can be considered to comprise the following components: (1) classification rules and (2) QoS Requirements.

Classification

Classification rules have been described above. A classification mask is bit mask that specifies which dimensions are specified by the terms of a classification rule or rules. The mask may be, for example, 8 bits in length covering the previously listed 8 dimensions of classification (source IP address, destination IP address, source TCP/UDP port, destination TCP/UDP port, protocol, incoming logical port, TOS/DS byte, and TCP Ack flag).

The following is the mask:

Bit 0: source IP address

Bit 1: destination IP address

Bit 2: source TCP/UDP port

Bit 3: destination TCP/UDP port

Bit 4: incoming logical port

Bit 5: TOS/DS byte

Bit 6: protocol

Bit 7: TCP Ack flag

If bit 0 in the mask is set to 1, there is a rule term for source IP address in the classification rules, otherwise, if bit 0 in the mask is set to 0, there is no source IP address rule term.

FIG. 15 is a diagram of a classification bit mask according to one embodiment. For example, if the mask is 19, the binary version of this is 10011, bits 0, 1 and 4 are set. This means that the classification rule:

specifies source IP address, destination IP address and incoming logical port does not specify source TCP/UDP port, destination TCP/UDP port, TOS/DS byte, protocol, or TCP Ack flag i.e. any value is acceptable.

The ESP performs longest prefix matching for the two IP address dimensions. For other dimensions, a more specific range or values fully contained in a less specific range is given preference.

Classification Rule Compilation

The ESP uses a classification engine in the packet processing pipeline to classify packets. The classification engine compares the packet header and environment data items with rules associated with leaf classes. To deploy a new policy, it is necessary to compile the classification rules into a form that the classification engine can use. This involves the merging of rules from parent classes down into child classes unless a child class overrides a parent class rule with a more specific rule.

Figure 16:
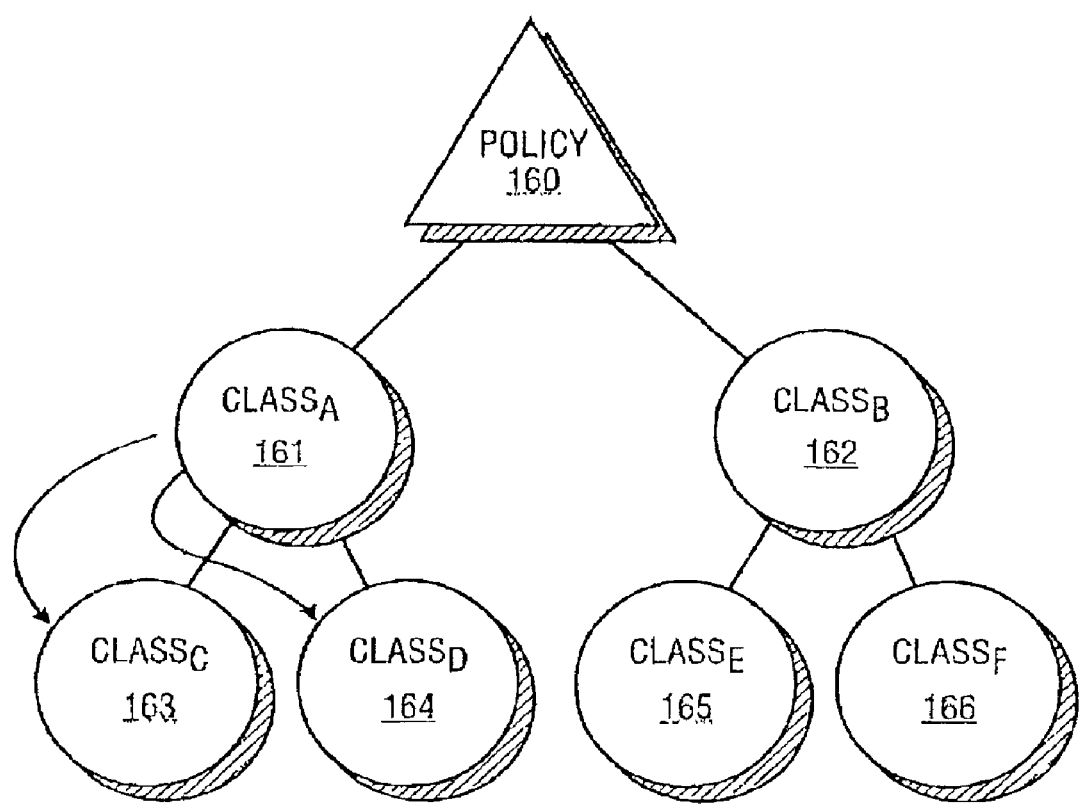
FIG. 16 is a schematic diagram illustrating a form of rule compilation according to one embodiment.

FIG. 16 is a schematic diagram illustrating a form of rule compilation according to one embodiment. For example, suppose there were two trees that looked like the one in FIG. 16, according to one embodiment. In the first tree, suppose:

Tree$_1$, Class$_A$ 161 rule: source IP=1.0.0.0/24

Tree$_1$, Class$_C$ 163 rule: destination IP=2.0.0.0/24

Tree$_1$, Class$_C$ 163 compiled rule: source IP=1.0.0.0/24, destination IP=2.0.0.0/24

Now suppose the second tree had:

Tree$_2$, Class$_A$ 161 rule: destination IP=2.0.0.0/24

Tree$_2$, Class$_C$ 163 rule: source IP=1.0.0.0/24

Tree$_2$, Class$_C$ 163 compiled rule: source IP=1.0.0.0/24, destination IP=2.0.0.0/24

Notice that both the first and second tree's Class$_C$ 163 have the same compiled rule, but the rule in Class$_A$ 161 and Class$_C$ 163 in both trees were different. In one embodiment, the classification engine only cares about the compiled rule for each leaf class. Therefore, the classification rules of Class$_C$ 163 in both trees are the same.

Rules for Compilation

Policy management requires each child's rules to be more restricted than its parent's rules. If a dimension of a child's rule is not a subset of the same dimension of its parent's rule, then an error has occurred. Again, it should be noted that if a parent class does not have a rule term for a dimension this is equivalent to the class having a rule term for that dimension that matches all legal values of the dimension. Child rules in one embodiment take precedent over parent rules. As a result, the child rule is in one embodiment used when parent and child rules are merged. For example:

| Parent Rule: | Source IP = 1.0.0.0/24, 2.0.0.0/24 |
| --- | --- |
| Child Rule: | Source IP = 1.0.0.2 |
| Merged Rule At Child: | Source IP = 1.0.0.2 |

The parent rule in the example means that packets can match a source IP address of 1.0.0.0/24 or 2.0.0.0/24. The child rules state that packets should match a source IP address of 1.0.0.2. When the merge of parent with child occurs, all the child rules prevail since the merge should be the largest subset between the two, which will in one embodiment be all the child's rules.

In one embodiment, if a value in a rule within a child is not a subset of the parent's values, then an error has occurred and should be reported back to the user. For example:

| Parent Rule: | Source IP = 1.0.0.0/24, 2.0.0.0/24 |
| --- | --- |
| Child Rule: | Source IP = 3.0.0.2 |
| Merged Rule At Child: | Source IP = <empty-error> |

In this example, the source IP address of the child is not a subset of any of the parent values resulting in an error.

If a parent rule is empty, it means all possible values are acceptable. If a child has rules in a dimension and the parent does not, then any value a child has is valid. For example:

| Parent Rule: | Source IP = |
| --- | --- |
| Child Rule: | Source IP = 1.0.0.2 |
| Merged Rule At Child: | Source IP = 1.0.0.2 |

Using this strategy reduces the parent classes to the child leaf classes by processing only similar dimension types first. Once all the dimension types are processed, then the expansion of the rules can be done.

Class Rule Compilation Notation

The following shorthand notation is used in subsequent examples:

Shorthand for Dimension Types

SIP=Source IP Subnet Value

DIP=Destination IP Subnet Value

SP=Source TCP/UDP port range Value

DP=Destination TCP/UDP port range Value

IP=Incoming logical Port Identifier Value

TOS=TOS/DS byte Value

P=Protocol Value

TCP=TCP Ack Flag Value

So SIP$_1$ could mean 1.0.0.0/24 and SIP$_2$ could mean 2.0.0.0/24.

Shorthand for Rules

The table shows the class levels in rows. The columns are the dimensions. The values in each cell is the subscript value meaning a unique value of that dimension type:

|  | SIP | DIP | SP | DP | IP | TOS | P | TCP |
| --- | --- | --- | --- | --- | --- | --- | --- | --- |
| Class Rule at Level 1: | 1,2,3 | 1,2 | 1 | 1,2 |  |  |  |  |
| Class Rule at Level 2: | 4,5 |  | 4,5 |  | 1 |  |  |  |

The above example table implies that there are two levels in the policy. Each row represents the rules in a single class. In this case the rules are:

Class Rule at Level 1: (SIP$_1$|SIP$_2$|SIP$_3$) & (DIP$_1$|DIP$_2$) & (SP$_1$) & (DP$_1$|DP$_2$)

Class Rule at Level 2: (SIP$_4$|SIP$_5$) & (SP$_4$|SP$_5$) & (IP$_1$)

If:

SIP$_1$=1.0.0.0/24

SIP$_2$=2.0.0.0/24

SIP$_3$=3.0.0.0/24

DIP$_1$=4.0.0.0/24

DIP$_2$=5.0.0.0/24

SP$_1$=10–100

DP$_1$=10–100

DP$_2$=200–300

Then

Class Rule at Level 1: (SIP=1.0.0.0/24|SIP=2.0.0.0/24|SIP=3.0.0.0/24) & (DIP=4.0.0.0/24|DIP=5.0.0.0/24) & (SP=10–100) & (DP=10–100|DP=200–300)

Figure 17:
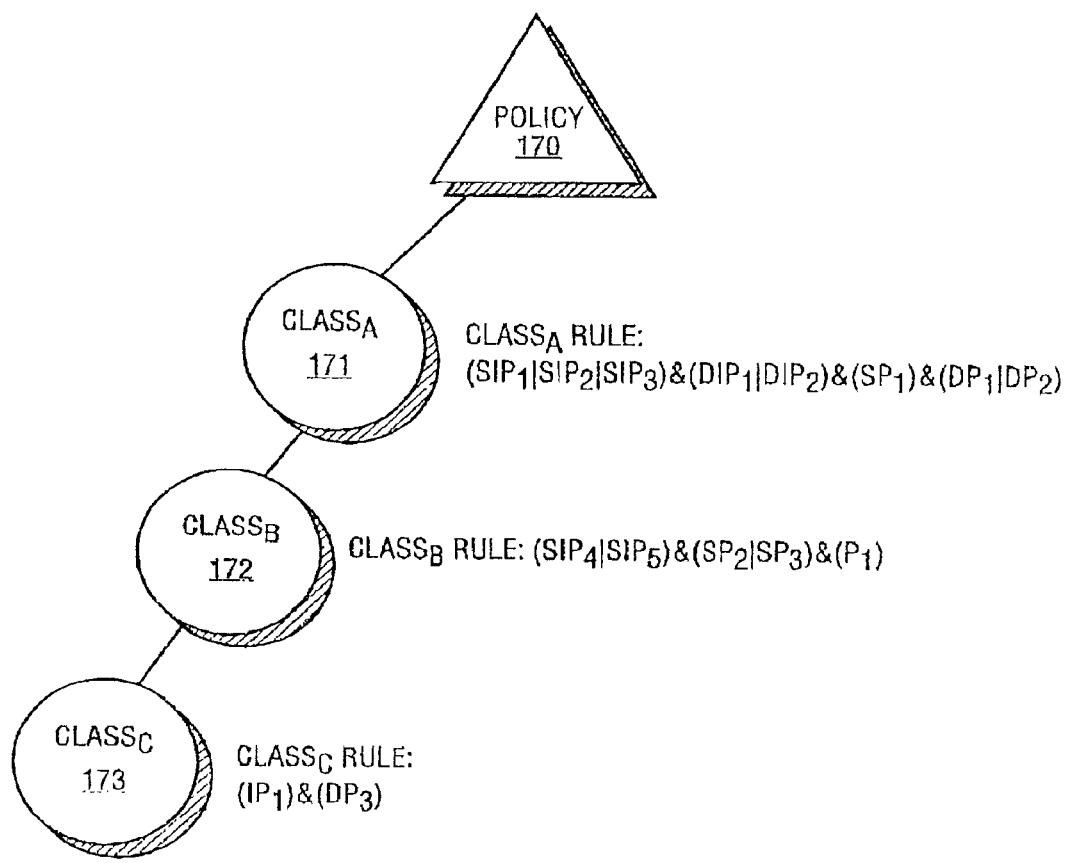
FIG. 17 is a schematic diagram illustrating an example path used in rule compilation according to one embodiment.

FIG. 17 is a schematic diagram illustrating an example path used in rule compilation according to one embodiment. The table to compile this would look like the following:

TABLE 1

Shorthand Compilation Table

|  | SIP | DIP | SP | DP | IP | P | TOS | TCP |
| --- | --- | --- | --- | --- | --- | --- | --- | --- |
| Class$_A$ 171 Rule | 1,2,3 | 1,2 | 1 | 1,2 |  |  |  |  |
| Class$_B$ 172 Rule | 4,5 |  | 2,3 |  |  | 1 |  |  |
| Class$_C$ 173 Rule |  |  |  |  | 3 | 1 |  |  |

Brute Force Rule Compilation

The brute force mechanism performs the compilation process using the following processes starting at the root class:

Expand the parent rules into a set of basic rules.
   Expand the child rules into a set of basic rules.
   Combine (logical AND) the parent basic rules and child basic rules.
   Eliminate more general terms in favour of more specific terms.
   Repeat this process downwards through the class tree until the child class is a leaf class.

This process requires more time than many users would be willing to tolerate. For example, if the following was given:

TABLE 2

Brute Force Compilation Example

|  | STP | DIP | SP | DP | IP | P | OS | TCP |
|---|---|---|---|---|---|---|---|---|
| Class$_A$ Rule | 1,2 | 1,2 | 1 | 1 |  |  |  |  |
| Class$_B$ Rule | 3 |  | 2 |  |  |  |  | 1 |

Then the compilation would be as follows:
Expand the parent rules into a set of basic rules:
(SIP$_1$ & DIP$_1$ & SP$_1$ & DP$_1$)|(SIP$_1$ & DIP$_2$ & SP$_1$ & DP$_1$)|(SIP$_2$ & DIP$_1$ & DIP$_1$ & SP$_1$ & DP$_1$)|(SIP$_2$ & DIP$_2$ & SP$_1$ & DP$_1$)
Next expand the child rules into a set of basic rules:
(SIP$_3$ & SP$_2$ & P$_1$)
Logically AND the parent and child basic rules:
(SIP$_1$ & DIP$_1$ & SP$_1$ & DP$_1$ & SIP$_3$ & SP$_2$ & P$_1$)|(SIP$_1$ & DIP$_2$ & SP$_1$ & DP$_1$ & SIP$_3$ & SP$_2$ & P$_1$)|(SIP$_2$ & DIP$_1$ & SP$_1$ & DP$_1$ & SIP$_3$ & SP$_2$ & P$_1$)|(SIP$_2$ & DIP$_2$ & SP$_1$ & DP$_1$ & SIP$_3$ & SP$_2$ & P$_1$)
Eliminate more general terms in favour of more specific terms. In this example, assume that SIP$_3$ is not a subset of SIP$_2$ but is a subset of SIP$_1$ and SP$_2$ is a subset of SP$_1$:
(DIP$_1$ & DP$_1$ & SIP$_3$ & SP$_2$ & P$_1$)|(DIP$_2$ & DP$_1$ & SIP$_3$ & SP$_2$ & P$_1$)
Notice that the number of basic rules has been reduced from 4 to 2, because SIP$_2$ disappeared eliminating 2 of the rules.

If SIP$_3$ were not a subset of SIP$_1$ or SIP$_2$, then the set would be empty. As previously mentioned, this would be an error.

Notice that in one embodiment, when the child rules were compiled in with the parent rules, whenever there was a specified child dimension, the child dimension essentially eliminated the parent dimension values. This will in one embodiment be the case and is the basis of the next compilation method.

Improved Rule Compilation

Another embodiment for compiling rules takes advantage of rule elimination (shown in a previous section).

The technique processes a pair of parent-child rules at a time. Specifically, compile the root and its child to get a new set of rules. Then compile the resulting rules with the next child's rules. Note that the rules are not expanded out to their basic rules until the leaf child has been reached.

When compiling parent and child rules together, terms for each dimension are processed separately. Logically AND the terms for each dimension together to create a new rule. When doing this, the only check that needs to be done is to ensure each child rule term is a subset of at least one parent rule term of the same dimension. If this check succeeds, then the new rule generated will simply contain all the child rule terms.

Consider the example in the brute force section:

TABLE 3

Rule Compilation Example

|  | SIP | DIP | SP | DP | IP | P | TOS | TCP |
|---|---|---|---|---|---|---|---|---|
| Class$_A$ Rule | 1,2 | 1,2 | 1 | 1 |  |  |  |  |
| Class$_B$ Rule | 3 |  | 2 |  |  | 1 |  |  |

Then the following would be done:

TABLE 4

New Rule Generation Example

|  | SIP | DIP | SP | DP | IP | P | OS | TCP |
|---|---|---|---|---|---|---|---|---|
| Class$_A$ Rule | 1,2 | 1,2 | 1 | 1 |  |  |  |  |
| Class$_B$ Rule | 3 |  | 2 |  |  | 1 |  |  |
| New Rule | 3 | 1,2 | 2 | 1 |  | 1 |  |  |

Notice that if the child rule terms are valid (meaning that all the child rule terms are a subset of at least one of the parent rule terms), then in one embodiment the child rule terms are in the new rule expression, not the parent rule terms.

In one embodiment, if a child rule term is not a subset of any of its parent rule terms, then an error has occurred and should be reported to the user. When the new rule at the child leaf class is finally created, then it can be expanded to its basic rules:

(SIP$_3$ & DIP$_1$ & SP$_2$ & DP$_1$ & P$_1$)|(SIP$_3$ & DIP$_2$ & SP$_2$ & DP$_1$ & P$_1$)

Notice that this is the same result as the brute force method, but the technique was much simpler. If there were a class under Class$_B$, then the rules for the new child class would be combined with the New Rule generated by combining Class$_A$ and Class$_B$ before expanding to the basic rules.

Detection of Possible Equivalent Leaf Classes

Once the rules are compiled in both policy trees, leaf classes are analyzed to detect possible equivalent leaf classes.

It is inefficient to simply perform a pairwise comparison of classes in the old and new policy trees to see if their compiled classification rules are equivalent. If each tree has approximately N classes, then each of N classes in the old policy can be compared with up to N classes in the new policy. On average it will be necessary to examine N/2 classes in the new policy before a match is found. If classes in the new policy are marked as being part of a match then it will be necessary to examine N/4 classes in the new policy on average. This results in a total of $N^2/4$ class comparisons. This assumes of course that the new policy is only a slight modification of the old policy. If not, the absolute worse case of $N^2$ class comparisons may have to be performed only to find that there are no matches.

Instead it can be preferable to use a method whereby one only needs to completely process the classes in one of the trees. The logical choice would be the old policy tree since its classes are the ones that can be carried forward unchanged into the new policy. As each class in the old policy tree is processed it would be preferable to have a method that would compare the class to only log N or fewer classes in the new policy tree.

Log N Data Structure Method

One method for doing this is to define a comparison function that returns a result of less than, equals, or greater than when it is provided with the classification rules of two classes to compare. The comparison function is used as the basis for inserting all of the classes from the new policy tree into a suitable data structure. An appropriate data structure would be a binary tree, skip list, or the like that supports O(log N) insert and search performance. The result is that all of the classes from the new policy tree are sorted in the order dictated by the chosen comparison function.

Proceeding in an iterative manner, each class from the old policy is compared with the classes in the data structure in order to identify a class from the new policy with equivalent classification rules. Because the data structure supports O(log N) searching, identification of equivalent leaf classes should be accomplished with performance of O(N log N).

Rule Pre-Processing

Determination of classification rule equality will be eased if the classification rules of each class are pre-processed to maximize correspondence and consistency.

Rule terms should be simplified as much as possible. For example, if a rule contained two rule terms for a single dimension, they should be coalesced into a single term. If a rule term contains multiple constant values/ranges, adjacent or overlapping values should be merged into a single constant range value.

If a class has multiple rules, some basis should be chosen for sorting the rules. This allows corresponding rules of two classes to be easily compared.

Comparison Functions

The chosen comparison function should be able to accurately determine that the classification rules of two classes are equal. Other than equality, an arbitrary basis can be used to determine that the rules of one class are less than or greater than the rules of the other class.

One possible comparison function for the rules of two classes A and B might be based on the following logic:

1. Compare the number of rules each class has. If the number of rules is identical, continue with step 2. If class A has fewer rules, return less than as the value of the function. Otherwise return greater than.

2. Compare the classification masks of corresponding rules. If each pair of rules has identical masks, continue with step 3. For the first mismatching pair of rules, if the binary value of mask A is less than the binary value of mask B, return less than as the value of the function. Otherwise return greater than.

3. Compare the number of constant values/ranges in the source IP address terms of corresponding rules. If each pair of rules has the same number of constant values/ranges, continue with step 4. For the first mismatching pair of rules, if rule A has fewer constant values/ranges, return less than as the value of the function. Otherwise return greater than.

4. Compare the constant values/ranges in the source IP address terms of corresponding rules. If each pair of rules has the same constant values/ranges, continue with step 5. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

5. Compare the number of constant values/ranges in the destination IP address terms of corresponding rules. If each pair of rules has the same number of constant values/ranges, continue with step 6. For the first mismatching pair of rules, if rule A has fewer constant values/ranges, return less than as the value of the function. Otherwise return greater than.

6. Compare the constant values/ranges in the destination IP address terms of corresponding rules. If each pair of rules has the same constant values/ranges, continue with step 7. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

7. Compare the number of constant values/ranges in the source TCP/UDP port terms of corresponding rules. If each pair of rules has the same number of constant values/ranges, continue with step 8. For the first mismatching pair of rules, if rule A has fewer constant values/ranges, return less than as the value of the function. Otherwise return greater than.

8. Compare the constant values/ranges in the source TCP/UDP port terms of corresponding rules. If each pair of rules has the same constant values/ranges, continue with step 9. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

9. Compare the number of constant values/ranges in the destination TCP/UDP port terms of corresponding rules. If each pair of rules has the same number of constant values/ranges, continue with step 10. For the first mismatching pair of rules, if rule A has fewer constant values/ranges, return less than as the value of the function. Otherwise return greater than.

10. Compare the constant values/ranges in the destination TCP/UDP port terms of corresponding rules. If each pair of rules has the same constant values/ranges, continue with step 11. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

11. Compare the number of constant values/ranges in the protocol terms of corresponding rules. If each pair of rules has the same number of constant values/ranges, continue with step 12. For the first mismatching pair of rules, if rule A has fewer constant values/ranges, return less than as the value of the function. Otherwise return greater than.

12. Compare the constant values/ranges in the protocol terms of corresponding rules. If each pair of rules has the same constant values/ranges, continue with step 13. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

13. Compare the number of constant values/ranges in the TOS/DS byte terms of corresponding rules. If each pair of rules has the same number of constant values/ranges, continue with step 14. For the first mismatching pair of rules, if rule A has fewer constant values/ranges, return less than as the value of the function. Otherwise return greater than.

14. Compare the constant values/ranges in the TOS/DS byte terms of corresponding rules. If each pair of rules has the same constant values/ranges, continue with step 15. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

15. Compare the constant values in the TCP Ack flag terms of corresponding rules. If each pair of rules has the same constant values, continue with step 16. For the first mismatching constant value in the first mismatching pair of rules, if the rule A constant value has a lesser value, return less than as the value of the function. Otherwise return greater than.

16. Compare the number of constant values/ranges in the input logical port terms of corresponding rules. If each pair of rules has the same number of constant values/ranges, continue with step 17. For the first mismatching pair of rules, if rule A has fewer constant values/ranges, return less than as the value of the function. Otherwise return greater than.

17. Compare the constant values/ranges in the input logical port terms of corresponding rules. If each pair of rules has the same constant values/ranges, continue with step 18. For the first mismatching constant value/range in the first mismatching pair of rules, if the rule A constant value/range has a lesser value (constant value), lesser starting value (constant range), or lesser final value (constant range), return less than as the value of the function. Otherwise return greater than.

18. Return equals as the value of function.

Hash Table Method

An alternative method for identifying possible equivalent leaf class pairs uses a hash table. This method can provide better performance. A hash function is chosen that generates a hash index based on many of the parameters used in the comparison function described above. The hash index is used to index into a hash table that is several times larger than the expected number of classes. If the chosen hash function has good uniformity, there will be very few collisions.

The classes from the new policy are inserted into the hash table. Iterating over the classes in the old policy, the hash index is calculated. If the hash index of a class in the old policy tree corresponds to the hash index of a class in the new policy tree, a detailed comparison of the classification rules of the two classes is performed. A variant of the above comparison function that only tests for equality could be used.

Use of a hash table method should provide O(N) performance.

The chosen hash function should keep in mind that real-life classification rules are more likely to include terms for the source IP address, destination IP address, source TCP/UDP port, destination TCP/UDP port, and protocol dimensions than other dimensions. Clustering of source and destination IP addresses will be seen. Clustering of quantities of constant values/ranges will also be seen.

Policy Differentiation

In one embodiment, the ESP classification engine is not concerned with the structure of parent classes above the leaf classes. It is only concerned with the compiled rules for each leaf class.

However, the ESP packet scheduler cares about the structure of classes, because its packet handling mirrors the tree structure. To generate the data structures that will control the packet scheduler, it is strongly preferred that we find the minimum set of changes that will transform the old data structures into the new structures. Class adds and deletes cause the most disruption in the packet processing pipeline whereas class changes and class equivalencies cause little or no disruption to the running packet pipeline.

If the packet treatment of a class is changed, it can be handled by a class change, because this only requires that parameters in the existing data structure be modified.

If the classification rules of a class change, the class in the old policy should be completely deleted and the revised class added to the new tree. This is because packets queued in the old class may not satisfy the new classification rules. Classification rule changes only affect the packet scheduler for leaf classes, since it is not aware of any rules existing for non-leaf classes.

The focus of policy differentiation should be to identify incompatible changes in leaf class classification rules. As will be described in more detail below, structural considerations such as tree depth can also come into play.

Parent Lineage Rules

The packet scheduler's packet processing data structures mirror the structure of the policy tree. In one embodiment, the following rules concerning parent lineage should be satisfied if two leaf classes are to be considered equivalent:

the number of classes between leaf classes and the root should be identical if a pair of leaf classes in the old policy is to be considered equivalent to a pair of leaf classes in the new policy, and either pair has the same parent class, the other pair should also have the same parent class.

Figure 18:
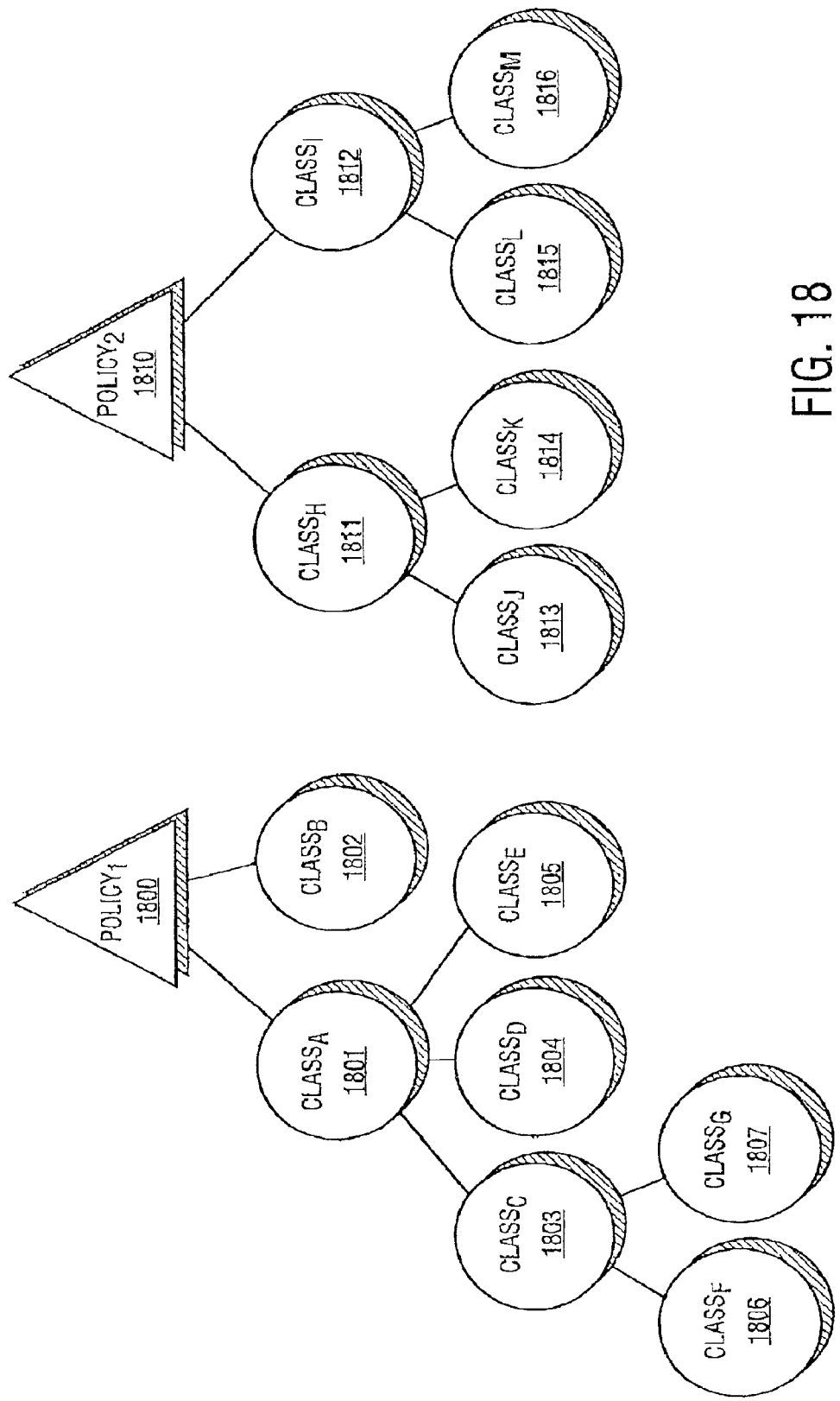
FIG. 18 is a schematic diagram illustrating an example of parent class lineage according to one embodiment.

FIG. 18 is a schematic diagram illustrating an example of parent class lineage according to one embodiment. Assume the following:

$Class_F$ 1806 and $Class_J$ 1813 have the same set of compiled rules ($rules_1$)

$Class_D$ 1804 and $Class_K$ 1814 have the same set of compiled rules ($rules_2$)

$Class_E$ 1805 and $Class_L$ 1815 have the same set of compiled rules ($rules_3$)

Notice the following parent class lineage:

$Class_F$ 1806: $Class_F$ 1806→$Class_C$ 1803→$Class_A$ 1801

$Class_D$ 1804: $Class_D$ 1804→$Class_A$ 1801

$Class_E$ 1805: $Class_E$ 1805→$Class_A$ 1801

$Class_J$ 1813: $Class_J$ 1813→$Class_H$ 1811

$Class_K$ 1814: $Class_K$ 1814→$Class_H$ 1811

$Class_L$ 1815: $Class_L$ 1815→$Class_I$ 1812

Applying the above rules:

$Class_F$ 1806 and $Class_J$ 1813 cannot be the same since $Class_F$ 1806 has two parents to the root whereas $Class_J$ 1813 has one $Class_D$ 1804 and $Class_K$ 1814 can be considered the same since they both have one parent to the root.

$Class_E$ 1805 and $Class_L$ 1815 cannot be considered the same even though both only have one parent to the root. This is because:

$Class_D$ 1804 and $Class_K$ 1814 have already been designated to be the same, $Class_D$ 1804 and $Class_E$ 1805 have the same parent, and $Class_K$ 1814 and $Class_L$ 1815 do not have the same parent. For $Class_E$ 1805 and $Class_L$ 1815 to be the same, $Class_L$ 1815 would have to be a child of $Class_H$ 1811.

Note that if $Class_E$ 1805 and $Class_L$ 1815 were considered to be the same, then $Class_D$ 1804 and $Class_K$ 1814 could not be considered the same for the same reason.

Determining Parent Lineage Equality

In one embodiment, only those leaf classes that have the same compiled classification rules need to be checked for parent lineage equality.

In an embodiment, if two leaf classes are to be considered equivalent, their complete parent lineage should be considered equivalent. In situations where it is ambiguous as to which parent classes are to be considered equivalent, in one embodiment, the ambiguity should be resolved in favour of the parent that maximizes the number of equivalent leaf classes.

Figure 19:
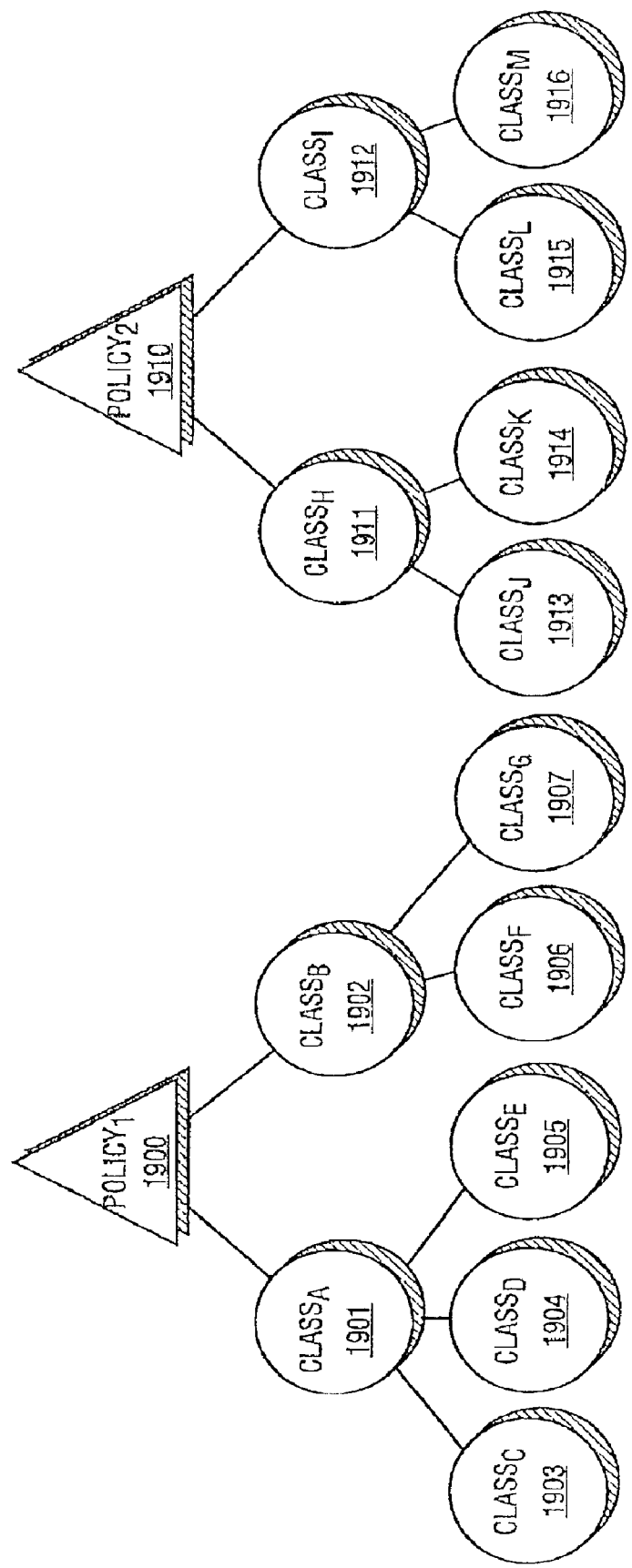
FIG. 19 is a schematic diagram illustrating an example of resolving ambiguity in the equivalence of parent classes.

FIG. 19 is a schematic diagram illustrating an example of resolving ambiguity in the equivalence of parent classes. The structure of the two policies is as follows:

$Class_C$ 1903, $Class_D$ 1904 and $Class_E$ 1905 are under the same $Class_A$ 1901

$Class_F$ 1906 and $Class_G$ 1907 are under the same $Class_B$ 1902

$Class_J$ 1913 and $Class_K$ 1914 are under the same $Class_H$ 1911

$Class_L$ 1915 and $Class_M$ 1916 are under the same $Class_I$ 1912

Assume the following:

$Class_C$ 1903 has the same set of compiled rules as $Class_J$ 1913

$Class_D$ 1904 has the same set of compiled rules as $Class_K$ 1914

$Class_E$ 1905 has the same set of compiled rules as $Class_L$ 1915

$Class_F$ 1906 has the same set of compiled rules as $Class_M$ 1916

Consider the possibility of making a final determination that $Class_E$ 1905 and $Class_L$ 1915 are equivalent. This would necessitate that $Class_A$ 1901 and $Class_I$ 1912 be considered equivalent. This would prevent the $Class_C$ 1903=$Class_J$ 1913 and $Class_D$ 1904=$Class_K$ 1914 equivalencies, because those equivalencies require that $Class_A$ 1901 and $Class_H$ 1911 be considered equivalent. In order to minimize change, this ambiguity would be resolved by preferring the $Class_C$ 1903=$Class_J$ 1913 and $Class_D$ 1904=$Class_K$ 1914 equivalencies.

Equivalent Parent Lineage Determination

To find equivalent parent lineage, iterate downwards through the levels of the two policy trees, starting at the root, and find the most matching sets of leaf classes under the classes at the given level.

A level iteration discards leaf classes that do not have the same parent lineage at that level, but will keep the best matching leaf classes.

In an embodiment, this is done by:

Before iterating, number each of the classes in both trees.

Find the pairs of leaf classes (a pair consists of a leaf class from one policy tree and a leaf class from the other policy tree) that have the same set of compiled rules.

Iterate downwards through the levels of classes in both policy trees (note that there is no need to iterate over the leaf class level, since it will not be a parent of any classes)

For each node at the given level, assign to the node all descendant leaf classes that are equivalent to leaf classes in the other policy tree Iteratively find pairs of nodes, one in each tree, at the given level that share the greatest number of equivalent leaf class pairs. Consider this pair of nodes to be equivalent and remove it and their assigned leaf classes from consideration. Continue iterating until there are no more nodes with assigned leaf classes.

For any leaf class that has been assigned to one of the nodes, and the equivalent leaf class has not been assigned to the other node, drop that equivalent leaf class pair from future consideration as an equivalent leaf class pair.

Class Numbering

Figure 20:
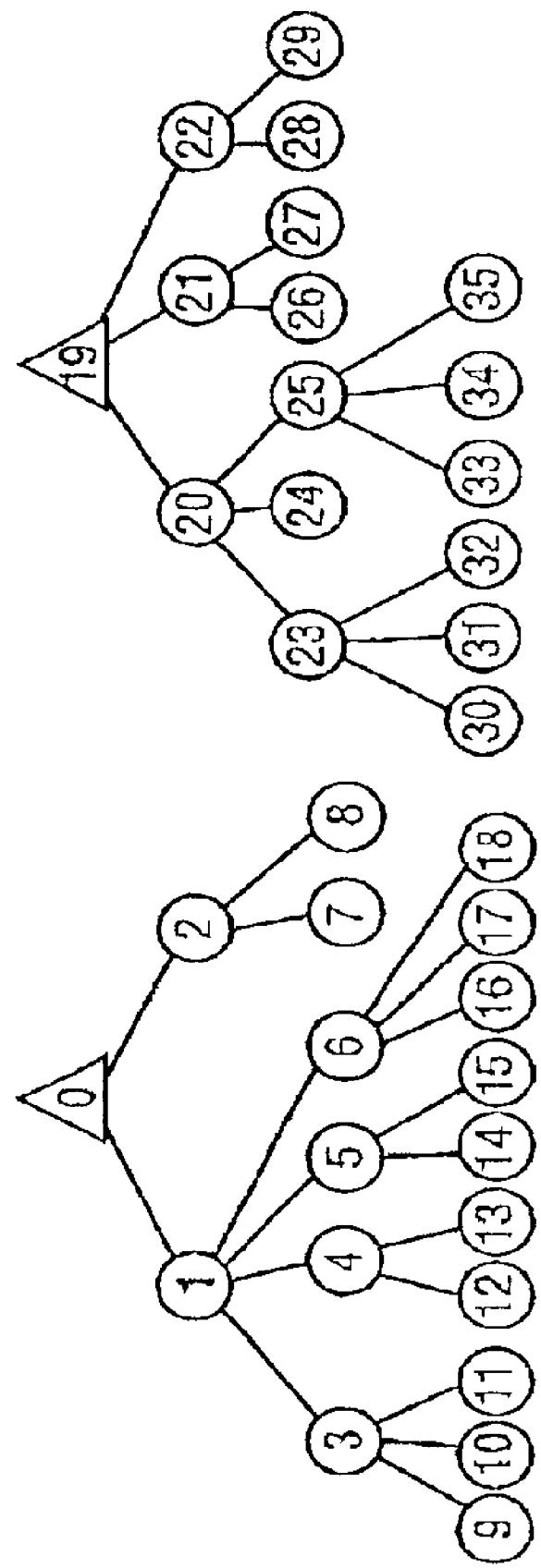
FIG. 20 is a schematic diagram illustrating class numbering according to one embodiment.

FIG. 20 is a schematic diagram illustrating class numbering according to one embodiment. It shows the classes and policies numbered as specified.

Finding Matching Class Pairs

In an embodiment, the pairs of leaf classes that have the same set of compiled rules are found. In this example, assume the following:

Set of compiled rules in $Class_{11}$=Set of compiled rules in $Class_{32}$

Set of compiled rules in $Class_9$=Set of compiled rules in $Class_{33}$

Set of compiled rules in $Class_{10}$=Set of compiled rules in $Class_{35}$

Set of compiled rules in $Class_{12}$=Set of compiled rules in $Class_{24}$

Set of compiled rules in $Class_7$=Set of compiled rules in $Class_{28}$

Set of compiled rules in $Class_8$=Set of compiled rules in $Class_{29}$

So the equivalent leaf classes are: (1) 11, 32; (2) 9, 33; (3) 10, 35; (4) 12, 24; (5) 7, 28; and (6) 8, 29

Level Iteration

In an embodiment, a process iterates over the levels. Specifically:

The root level would consist of finding all the leaf classes under $root_0$ and $root_{19}$.

The next level would be to find the leaf classes under $Class_1$, $Class_2$, $Class_{20}$, $Class_{21}$ and $Class_{22}$.

The last level would be to find the leaf classes under $Class_3$, $Class_4$ $Class_5$, $Class_6$, $Class_{23}$ and $Class_{25}$.

Consider the level grouping of Table 5:

TABLE 5

| | Equivalent Leaf Class Groups | |
|---|---|---|
| | $Root_0$ | $Root_{19}$ |
| Root Level | 7, 8, 9, 10, 11, 12 | 24, 28, 29, 32, 33, 35 |
| 2nd Level | 7, 8  9, 10, 11, 12 | 24, 32, 33, 35  28, 29 |
| 3rd Level | 9, 10, 11  12 | 32  33, 35 |

This table indicates the groups of class assignments to a common parent. Specifically:

Classes 7, 8, 9, 10, 12 have a common parent at the root level ($Root_0$)

Classes 7, 8 have a common parent at the $2^{nd}$ level ($Class_2$)

Classes 9, 10, 11, 12 have a common parent at the $2^{nd}$ level ($Class_1$)

Classes 9, 10, 11 have a common parent at the $3^{rd}$ level ($Class_3$)

Class 12 has a parent at the $3^{rd}$ level ($Class_4$)

Classes 24, 28, 29, 32, 33, 35 have a common parent at the root level ($Root_{19}$)

Classes 24, 32, 33, 35 have a common parent at the $2^{nd}$ level ($Class_{20}$)

Classes 28, 29 have a common parent at the $2^{nd}$ level ($Class_{22}$)

Class 32 has a parent at the $3^{rd}$ level ($Class_{23}$)

Classes 33, 35 have a common parent at the $3^{rd}$ level ($Class_{25}$)

Matching Nodes at Each Level of Iteration

At each of the levels, the pairs of nodes sharing the most equivalent leaf class pairs are found. The equivalent leaf class nodes corresponding to unshared leaf classes assigned to the nodes are discarded.

For example, the following leaf classes are assigned to the two root nodes:

7, 8, 9, 10, 11, 12 to $Root_0$

24, 28, 29, 32, 33, 35 to $Root_{19}$

Each of the six leaf classes on the left is equivalent to one of the six leaf classes on the right. For example, $Class_{11}$ has the same set of compiled rules as $Class_{32}$. There are no unmatched leaf classes. This will be true of the root node, so we can conclude that downwards iteration through the policy tree can start at the level below the root nodes. The only reason for including the root nodes would be if a tree were allowed to have multiple root nodes.

At the second level, the leaf classes are assigned to second level nodes as follows:

7, 8 to $Class_2$
9, 10, 11, 12 to $Class_1$
24, 32, 33, 35 to $Class_{20}$
28, 29 to $Class_{22}$ The pair of nodes with the greatest number of equivalent leaf classes in common is $Class_1$ and $Class_{20}$ followed by $Class_2$ and $Class_{22}$:

9, 10, 11, 12 and 24, 32, 33, 35
7, 8 and 28, 29

All of the leaf classes assigned to each node are associated with an equivalent leaf class assigned to the other node of the respective pairs, so nothing is discarded at this level either. Consider the third level assignments: (1) 9, 10, 11 to $Class_3$; (2) 12 to $Class_4$; (3) 32 to $Class_{23}$; and (4) 33, 35 to $Class_{25}$.

The best pairing of nodes is $Class_3$ and $Class_{25}$ includes 9, 10, 11 and 33, 35

Of these five classes, 9, 33 and 10, 35 are equivalent leaf class pairs. This leaves $Class_{11}$ that can't be matched up, because its equivalent leaf class $Class_{32}$ is a descendant of a different third level node $Class_{23}$. As a result the equivalent leaf class pair 11, 32 is eliminated as an equivalent leaf class pair.

With all of these classes removed from consideration, the only class left is 12, so it can't be matched with anything. Since it can't be matched with anything at the third level, the equivalent leaf class pair 12, 24 is eliminated as an equivalent leaf class pair.

The final result of matching is the determination that the following equivalent leaf class pairs have the same parent lineage and can considered unchanged or modified: (1) 19, 33; (2) 10, 35; (3) 7, 28; and (4) 8, 29.

They and their ancestor classes will be retained, and only modified, during deployment of the new policy.

When equivalent leaf classes are resident at different levels in the old and new policy trees, they will be eliminated in one embodiment. They may share the same parent classes down through the one leaf class of the pair that is resident at the higher level in either the old or new tree. When iteration reaches the lower leaf class of the pair however, the higher leaf class will no longer be shown as being associated with any node in the other tree at the deeper level, because no node at the deeper level in the other tree can have the higher node as a descendant. This will result in the pair being eliminated in one embodiment, if they are not eliminated for other reasons.

Array-Based Node Matching

Another embodiment for finding the best matching pairs of nodes will now be described. Initially, the method starts with the second level of the old and new policy trees. An empty array is created with one row for each node in the old policy tree at the current level and one column for each node in the new policy tree at the current level. The number of equivalent leaf class pairs shared by each pair of nodes in the old and new policy trees at the current level are placed into the matrix. The entry with the highest number in the matrix is located. Once that number is found, the corresponding pair of nodes is deemed to match. The row and column from the matrix containing the entry with the highest number are eliminated. Locating of the entry with the highest number, finding the corresponding pair of nodes that match and eliminating the row and column from the matrix is repeated until either the matrix disappears (all rows and columns have been eliminated) or all entries contain 0. In an embodiment, this process is repeated for each level of the old and new policy trees where one of the trees has at least one lower level. In other words, this process is not repeated for the lowest level of the deepest tree.

In the above example, the following table was given:

TABLE 6

| | Equivalent Leaf Class Groups | |
|---|---|---|
| | $Root_0$ | $Root_{19}$ |
| Root Level | 7, 8, 9, 10, 11, 12 | 24, 28, 29, 32, 33, 35 |
| 2nd Level | 7, 8   9, 10, 11, 12 | 24, 32, 33, 35   28, 29 |
| 3rd Level | 9, 10, 11   12 | 32   33, 35 |

From before, this table indicates the groups of class assignments to a common parent. In particular, classes 7, 8, 9, 10, 11, 12 have a common parent at the root level ($Root_0$). Classes 7, 8 have a common parent at the $2^{nd}$ level ($Class_2$). Additionally, classes 9, 10, 11, 12 have a common parent at the $2^{nd}$ level ($Class_1$). Classes 9, 10, 11 have a common parent at the $3^{rd}$ level ($Class_3$). Class 12 has a parent at the $3^{rd}$ level ($Class_4$). Classes 24, 28, 29, 32, 33, 35 have a common parent at the root level ($Root_{19}$). Classes 24, 32, 33, 35 have a common parent at the $2^{nd}$ level ($Class_{20}$). Classes 28, 29 have a common parent at the $2^{nd}$ level ($Class_{22}$). Class 32 has a parent at the $3^{rd}$ level ($Class_{23}$). Classes 33, 35 have a common parent at the $3^{rd}$ level ($Class_{25}$).

As described above in an embodiment, each level should be processed separately. At the second level a matrix is created for the five nodes in the old and new policy trees:

TABLE 7

| | Second Level Matrix | | |
|---|---|---|---|
| | $Class_{20}$ | $Class_{21}$ | $Class_{22}$ |
| $Class_1$ | 4 | 0 | 0 |
| $Class_2$ | 0 | 0 | 2 |

$Class_1$ and $Class_{20}$ share the equivalent leaf class pairs: (1) 11, 32; (2) 9, 33; (3) 10, 35; and (4) 12, 24 so their entry in the array has a value of 4. Similarly, $Class_2$ and $Class_{22}$ share the equivalent leaf class pairs: (1) 17, 28 and (2) 8, 29 so their entry in the array has a value of 2. As there are only 6 equivalent leaf class pairs, all other array entries are 0.

The largest value in this matrix is found. In this case the value is 4, so $Class_1$ and $Class_{20}$ are designated as being equivalent. The $Class_1$ row and the $Class_{20}$ column of the matrix are eliminated to leave:

TABLE 8

| | Revised Second Level Matrix | |
|---|---|---|
| | $Class_{21}$ | $Class_{22}$ |
| $Class_2$ | 0 | 2 |

The next largest value is 2, so $Class_2$ and $Class_{22}$ are designated as being equivalent. Once the $Class_2$ row and the Class$_{22}$ column have been eliminated, the matrix has disappeared, so level 2 of the policy trees has been completed.

At the third level, the following matrix is created:

TABLE 9

Third Level Matrix

|  | Class$_{23}$ | Class$_{25}$ |
|---|---|---|
| Class$_3$ | 1 | 2 |
| Class$_4$ | 0 | 0 |
| Class$_5$ | 0 | 0 |
| Class$_6$ | 0 | 0 |

Class$_3$ and Class$_{23}$ share the equivalent leaf class pairs: 11, 32 while Class$_3$ and Class$_{25}$ share the equivalent leaf class pairs: 9, 33 and 10, 35

Notice that the other three equivalent leaf class pairs are not represented in the level 3 matrix. This is because Class$_7$ and Class$_8$ in the old policy tree and Class$_{24}$, Class$_{28}$, and Class$_{29}$ in the new policy tree reside at level 3 and are not children of level 3 classes.

The largest value in this matrix is the value 2, so Class$_3$ and Class$_{25}$ are designated as being equivalent. The equivalent leaf class pair 11, 32 shared by Class$_3$ and Class$_{23}$ is eliminated from consideration as an equivalent leaf class pair. The Class$_3$ row and the Class$_{25}$ column of the matrix are eliminated to leave:

TABLE 10

Revised Third Level Matrix

|  | Class$_{23}$ |
|---|---|
| Class$_4$ | 0 |
| Class$_5$ | 0 |
| Class$_6$ | 0 |

Since there are no non-zero entries, the third level has been completed. The fourth level of the old and new policy trees consist only of leaf classes, so the overall method has also finished.

It will be noticed that this method confirms the equivalency of equivalent leaf class pairs as a side effect of selecting an array entry with the highest value.

It may also be noticed that the matrix method does not detect equivalent leaf classes that are at different levels of the old and new policy trees. If the matrix method is used, these leaf classes can be eliminated either by a simple comparison of tree level when they are first proposed as being equivalent (e.g. by incorporating policy level into the comparison function or hash function), or they can be detected as a side effect of constructing array entries.

Marking Classes as being Modified, Unchanged, Added or Deleted

The previous section illustrates how equivalent ancestor classes are identified and how proposed equivalent leaf class pairs are confirmed as being equivalent or are eliminated as being equivalent. Each class in both policy trees is marked as: unchanged, modified, added or deleted.

All equivalent ancestor classes and confirmed equivalent leaf classes found by the methods of the previous section are marked as being either unchanged or modified. The choice of marking these classes as either unchanged or modified depends on whether a pairwise comparison of equivalent classes indicates whether they have any differences.

Consider the same two policies that were used as an example in the previous section. Using either of the methods in that section it was determined that the following classes were equivalent: (1) Root$_0$ and Root$_{19}$; (2) Class$_1$ and Class$_{20}$; (3) Class$_2$ and Class$_{22}$; (4) Class$_3$ and Class$_{25}$; (5) Class$_7$ and Class$_{28}$; (6) Class$_8$ (7) Class$_9$ and Class$_{33}$; and (8) Class$_{10}$ and Class$_{35}$.

Figure 21:
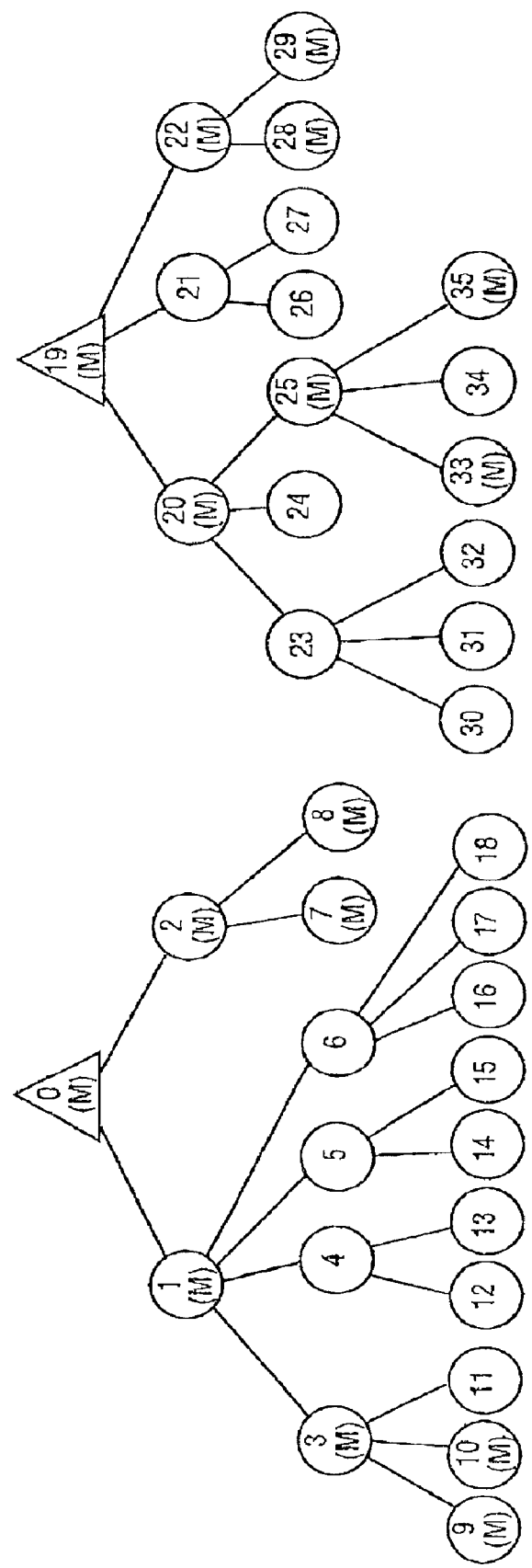
FIG. 21 is a schematic diagram illustrating the marking of classes as modified according to one embodiment.

FIG. 21 is a schematic diagram illustrating the marking of classes as modified according to one embodiment. A class with (M) indicates that it has been marked as modified. If equivalent classes are identical, they would be marked as unchanged instead.

As a side effect of marking equivalent classes as being modified or unchanged, the class identifiers for the class in the old policy tree will be reused for the equivalent class in the new policy tree. The class identifiers identify data structure entries for classes in the classification engine and packet scheduler. It is important to reuse the class identifiers to minimize the disruption of converting from the old policy tree to the new policy tree.

Figure 22:
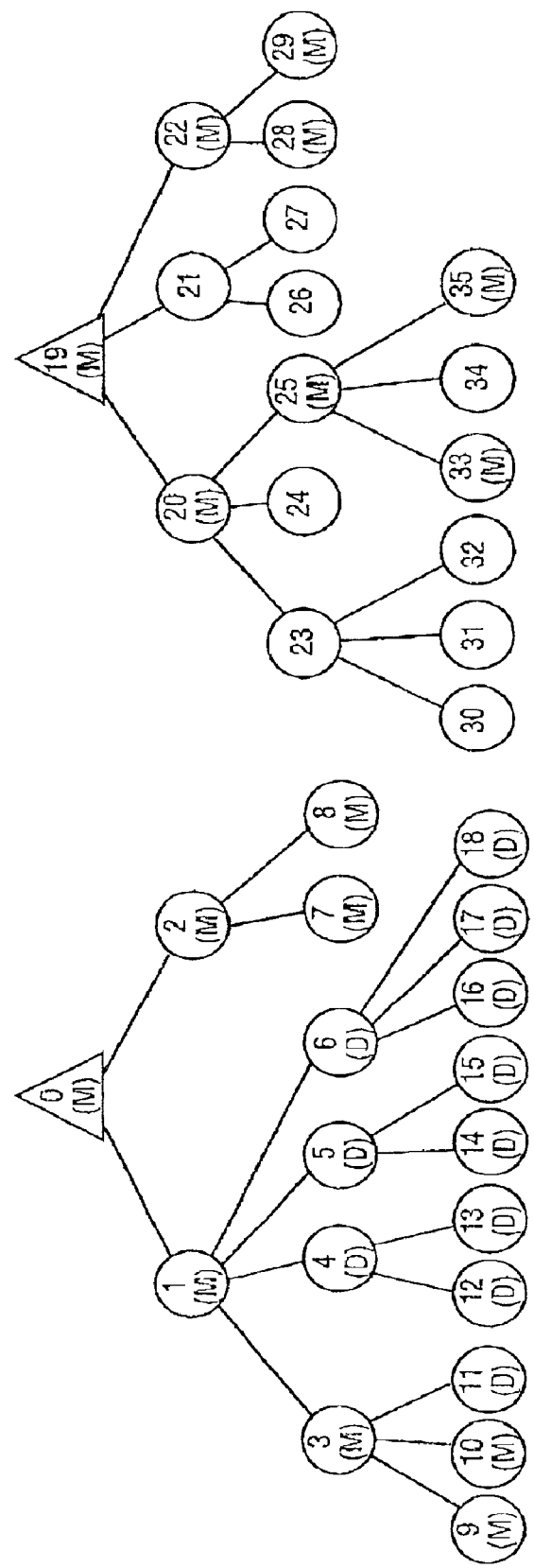
FIG. 22 is a schematic diagram illustrating the marking of classes as deleted according to one embodiment.

The remaining portions of the old policy are marked as being deleted. FIG. 22 is a schematic diagram illustrating the marking of classes as deleted according to one embodiment. A class with (D) indicates that it has been marked as deleted.

Figure 23:
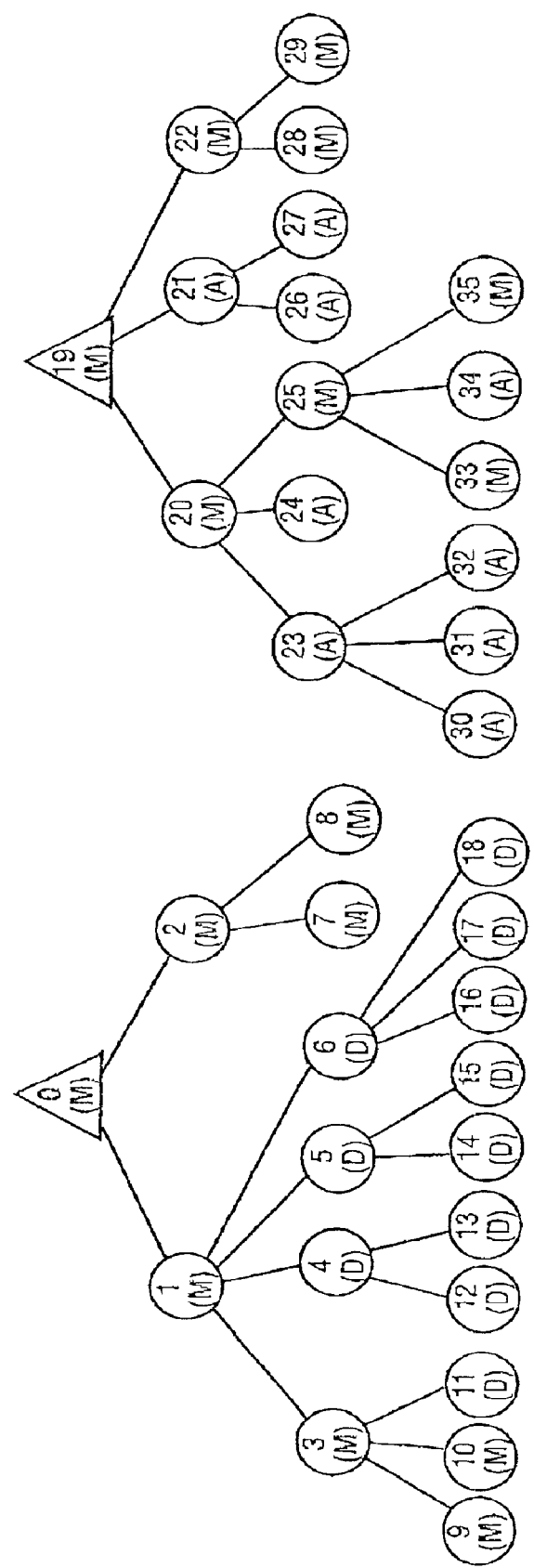
FIG. 23 is a schematic diagram illustrating the marking of classes as added according to one embodiment.

The remaining portions of the new policy are marked as being added. FIG. 23 is a schematic diagram illustrating the marking of classes as added according to one embodiment. A class with (A) indicates that it has been marked as added.

It should be noted that the example resulted in relatively few classes being marked as modified or unchanged. In practical network situations, policies tend to evolve as a series of minor changes. The differences between an old and new policy tend to be minor. The overall policy differentiation method described herein allows for minimizing the amount of disruptive changes in transitioning from the old policy to the new policy.

The processes and embodiments as described above can be stored on machine-readable medium as instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

As will be apparent to those skilled in the art in the light of the foregoing disclosure, many alterations and modifications are possible in the practice of this invention without departing from the spirit or scope thereof.

What is claimed is:

1. A method comprising:
   receiving a new policy tree at a network element in a network, wherein the network element stores a current policy tree of classes for quality of service (QoS) of packets being processed by the network element, and wherein the classes of the current policy tree and the classes of the new policy tree include leaf classes and non-leaf classes;
comparing the classes of the current policy tree with the classes of the new policy tree, including:
  for the current policy tree and the new policy tree, merging, into a set of classification rules of the leaf classes, classification rules of non-leaf classes that are parents of the leaf classes,
  identifying leaf class in the current policy tree as identical to a leaf class in the new policy tree upon determining that the set of classification rules of the leaf class in the current policy tree is equal to the set of classification rules of the leaf class in the new policy tree,
  identifying a non-leaf class in the current policy tree as identical to a non-leaf class in the new policy tree upon determining that the non-leaf class in the current policy tree and the non-leaf class in the new policy tree share a greatest number of equivalent descendant leaf classes, and
  marking classes of the current policy tree and the new policy tree as added, deleted, modified or unchanged based on the identifying of the identical leaf and non-leaf classes in the current policy tree and policy tree; and
selectively deleting classes of the current policy tree based on the comparison of the classes,
verifying each class of the new tree policy with respect to remaining classes of the new policy tree to avoid conflicts when the new policy is merged into a merged policy tree;
associating the merged policy tree with a termination point to activate the merged policy tree on the termination point; and
processing data packets using a packet processing pipeline according to the merged policy tree, the packet processing pipeline including
  an incoming packet manager (IPM) to examine a packet header of data packets to determine a next hop of the data packets,
  a class identifier (CI) coupled to the IPM to classify the data packets using the merged policy tree,
  a route identifier (RI) coupled to the CI to determine which output port through which each of the data packets should be routed,
  an outgoing packet manager (OPM) coupled to the RI to store the data packets for outgoing purposes,
  a flow identifier (FI) coupled to the OPM to identify one or more flows of which the data packets belong, and
  a traffic manager (TM) coupled to the FI to schedule the data packets out of the output port using a result of the FI and the merged policy tree,
wherein each class includes a class name, a type of service, and an amount of bandwidth associated with the respective class, wherein the leaf classes do not have a child class and are orthogonal to a remainder of the leaf classes, and wherein each non-leaf class as a parent class includes at least one leaf class as a child class and each leaf class includes a set of rules that are constrained by a parent class associated with the respective leaf class,
wherein a class having a parent class further includes all classification rules included in the parent class, wherein a leaf class as a child of the parent class includes a set of its own rules and attributes and inherits all rules and attributes of its parent class except a root of the respective policy tree, the root representing a data link associated with an output port of the network element and wherein the rules and attributes of a child class further limit the rules and attributes of its parent,
wherein each of the classes having at least two children classes is identified as a
  scheduling class and each of the classes not having a child class is identified as a flow class, wherein packets of each flow class are processed in an order of the packets stored in a queue and packets of each scheduling class are processed according to a predetermined schedule, and wherein at least one of the children classes of a scheduling class contains one or more flows that match the respective scheduling class and are not contained in a remainder of the children classes associated with the respective scheduling class,
wherein the network element includes an Ethernet interface card (EIC) coupled to
  a local area network (LAN and an ATM interface card (AIC) coupled to a wide area network (WAN), and wherein processing data packets using a packet processing pipeline further comprises:
    in response to a data packet received at the EIC from the LAN, a CI of the EIC classifying the data packet using identification of the policy tree,
    an RI of the EIC determining an output port through which the data packet should be routed using information of the policy tree,
    a FI of the AIC determining a flow to which the data packet belongs, using the policy tree, and
    transmitting the data packet to the WAN through the output port according to QoS based on the policy tree,
wherein the network element further comprises a controller card, wherein the controller card is to perform the following operations compiling each policy tree and generate a class lookup table (CLT) accessible by a CI of the EIC,
  associating each policy tree with a termination point and generate a routing table accessible by each RI for looking up a next hop based on a class ID, and
  creating a list of flow identifier and scheduling update commands to incrementally change the flow tables for FIs and traffic manager tables for TMs using flow class and scheduling class property information of the policy tree,
wherein associating the policy tree with a termination point comprises creating tables required by the CI and IPM,
  differentiating between classes that are currently in service from classes that will be put into services to generate a list of FI and TM update commands,
  distributing and synchronizing deleted classes by applying the tables and delete commands,
  distributing and synchronizing added classes by applying the tables and add commands, and
  distributing and synchronizing modified classes by applying the tables and modify commands, and
wherein each class comprises one or more classification rules, QoS requirements, and a classification mask to specify which dimensions are specified in terms of the one or more classification rules, where the classification mask comprises bit 0 to indicate a source IP address,
bit 1 to indicate a destination IP address,
bit 2 to indicate a source TCP/DP port,
bit 3 to indicate a destination TCP/UDP port,
bit 4 to indicate an incoming port,
bit 5 to indicate a type of service byte,
bit 6 to indicate a type of protocol used, and
bit 7 to indicate a TCP ACK flag.

2. The method of claim 1, wherein the QoS of packets includes a set of parameters which describe required traffic characteristics of a data connection of the packets, including a minimum bandwidth, a maximum delay, a maximum loss and jitter of the data connection, wherein each of the packets includes a packet header having a type of service field to store a value indicating a level of the QoS required for the respective packet, and wherein the level of the QoS is used to identify a class of policy for processing the respective packet by the network element.

3. The method of claim 1, wherein the selectively deleting classes of the current policy tree comprises deleting a class of the current policy tree upon determining that a set of classification rules of the class of the current policy tree is different than a set of classification rules of a corresponding class of the new policy tree.

4. The method of claim 3, wherein each class in the current and new policy tree is positioned at a level in the current and new policy tree and wherein the selectively deleting classes of the current policy tree comprises deleting a leaf class of the current policy tree upon determining that that the leaf class of the current policy tree is not positioned at a same level as a leaf class of the new policy tree.

5. The method of claim 1, wherein the selectively deleting classes of the current policy tree comprises selectively deleting at least one leaf class of the current policy tree.

6. The method of claim 1, wherein the selectively deleting classes of the current policy tree comprises selectively deleting at least one non-leaf class of the current policy tree.

7. The method of claim 1, wherein each class is positioned at a level in a policy tree and wherein a leaf class of the current policy tree is identical to a leaf class of the new policy tree only if the leaf class of the current policy tree and the leaf class of the new policy are positioned at an equal level.

8. The method of claim 7, wherein each leaf class in the current policy tree and the new policy tree is reciprocally linked to an associated path of non-leaf classes in the current policy tree and new policy tree, respectively, and wherein the selectively deleting classes of the current policy tree comprises deleting each leaf class in the current policy tree upon determining that the associated path of non-leaf classes in the current policy tree is different from the path of non-leaf classes in the new policy tree for a leaf class.

9. The method of claim 1, wherein each class in the current and new policy tree is positioned at a level in the current and new policy tree, wherein each leaf class in the current policy tree and the new policy tree is reciprocally linked to an associated path of non-leaf classes m the current policy tree and new policy tree, respectively, and wherein selectively deleting classes of the current policy tree comprises deleting a leaf class of the current policy tree upon determining that the associated path of non-leaf classes linked to the leaf class of the current policy tree includes a non-leaf class positioned at a different level than a corresponding non-leaf class included in the associated path of non-leaf classes linked to the leaf class of the new policy tree.

10. The method of claim 9, wherein the selectively deleting classes of the current policy tree comprises deleting a leaf class of the current policy tree upon determining that all ancestors of the leaf class of the current policy tree and corresponding ancestors of the leaf of the new policy tree have fewer identical descendant classes than those had by a class of the current policy tree and a class of the new policy tree positioned at the same level as the parents of the leaf class of the current policy tree and the ancestors of the leaf class of the new policy tree.

11. The method at claim 1, wherein each class identifies a subset of packets using one or more classification rules, each classification rule including one or more rule terms, and each rule term including an identity of a data item and a set of constant values associated with the data item, wherein the set of constant values includes at least one of individual values, ranges of constant values, IP subnets expressed in a notation of A.B.C.D/E where A.B.C.D is an IP address and /E indicates a number of leading bits that identify a subnet portion of the IP addresses.

12. The method of claim 11, wherein the data item is one of a source IP address, destination IP address, TCP/UDP source port, TCP/UDP destination port, ingress port of the network element, a type of service byte, a protocol type, and TCP acknowledgement flag.

13. The method of claim 12, wherein when a data packet is received at the network element, classification rules are evaluated to classify the data packet, wherein if the value of the data item matches any of the constant values associated with a rule term, the rule is satisfied, wherein if all rule terms of a classification rule are satisfied, the classification rule is satisfied, and wherein the classification rule is satisfied, the data packet is considered to belong to a class associated with the satisfied classification rule.

14. A machine-readable medium that provides instructions, which when executed by a machine, cause said machine to perform operations comprising:

receiving a new policy tree at a network element in a network, wherein the network element stores a current policy tree of classes for quality of service (QoS) of packets being processed by the network element, and wherein the classes of the current policy tree and the classes of the new policy tree include leaf classes and non-leaf classes;

comparing the classes of the current policy tree with the classes of the new policy tree, including for the current policy tree and the new policy tree, merging, into a set of classification rules of the leaf classes, classification rules of non-leaf classes that are parents of the leaf classes, identifying a leaf class in the current policy tree as identical to a leaf class in new policy tree upon determining that the set of classification rules of the leaf class in the current policy tree is equal to the set of classification rules of the leaf class in the new policy tree, identifying a non-leaf class in the current policy tree as identical to non-leaf class in the new policy tree upon determining that the non-leaf class in the current policy tree and the non-leaf class in the new policy tree share a greatest number of equivalent descendant leaf classes, and marking the class of the current policy tree and the new policy tree as added, deleted, modified or unchanged based on the identifying of the identical leaf and non-leaf classes in the current policy tree and new policy tree;

selectively deleting classes of the current policy tree based on the comparison of the classes;

verifying each class of the new policy tree with respect to remaining classes of the new policy tree to avoid conflicts when the new policy is merged into a merged policy tree;

associating the merged policy tree with a termination point to activate the merged policy tree on the termination point; and processing the data packets using a packet processing pipeline according to the merged policy tree, the packet processing pipeline including an incoming packet manager (PM) to examine a packet header of data packets to determine it next hop of the data packets, a class identifier (CI) coupled to the IPM to classify the data packets using the merged policy tree, a route identifier (RI) coupled to the CI to determine which output port through which each of the data packets should be routed, an outgoing packet manager (OPM) coupled to the RI to store the data packets for outgoing purposes, a flow identifier (FI) coupled to the OPM to identify one or more flows of which the data packets belong, and a traffic manager (TM) coupled to the FI to schedule the data packets out of the output port using a result of the FI and the merged policy tree, wherein each class includes a class name, a type of service, and an amount of bandwidth associated with the respective class wherein the leaf classes do not have a child class and are orthogonal to a remainder of the leaf classes, and wherein each non-leaf class as a parent class includes at least one leaf class as a child class and each leaf class includes a set of rules that are constrained by a parent class associated with the respective leaf class, wherein a class having a parent class further includes all classification rules included in the parent class, wherein a leaf class as a child of the parent class includes a set of its own rules and attributes and inherits all rule and attributes of its parent class except a root of the respective policy tree, the root representing a data link associated with an output port of the network element, and wherein the rules and attributes of a child class further limit the rules and attributes of its parent, wherein each of the classes having at least two children classes is identified as a scheduling class and each of the classes not having a child class is identified as a flow class, wherein packets of each flow class are processed in an order of the packets stored in a queue and packets of each scheduling class are processed according to a predetermined schedule, and wherein at least one of the children classes of a scheduling class contains one or more flows that match the respective scheduling class and are not contained in a remainder of the children classes associated with the respective scheduling class, wherein the network element includes an Ethernet interface card (EIC) coupled to a local area network (LAN) and an ATM interface card (AIC) coupled to a wide area network WAN), and wherein processing data packets using a packet processing pipeline further comprises:

in response to a data packet received at the EIC from the LAN, a CI of the EIC classifying the data packet using identification of the policy tree, an RI of the EIC determining an output port through which the data packet should be routed using information of the policy tree, a FI of the AIC determining a flow to which the data packet belongs, using the policy tree, and transmitting the data packet to the WAN through the output port according to QoS based on the policy tree, wherein the network element further comprises a controller card, wherein the controller card is to perform the following operations compiling each policy tree and generate a class lookup table (CLT) accessible by a CI of the EIC;

associating each policy tree with a termination point and generate a routing table accessible by each RI for looking up a next hop based on a class ID, and creating a list of flow identifier and scheduling update commands to incrementally change the flow tables for FIs and traffic manager tables for TMs using flow class and scheduling class property information of the policy tree, wherein associating the policy tree with a termination point comprises creating tables required by the CI and IPM, differentiating between classes that are currently in service from classes that will be put into services to generate a list of FI and TM update commands, distribution and synchronizing deleted classes by applying the tables and delete commands, distributing and synchronizing added classes by applying the tables and add commands, and distributing and synchronizing modified classes by applying the tables and modify commands, and wherein each class comprises one or more classification rules, QoS requirements, and a classification mask to specify which dimensions are specified in terms of the one or more classification rules, where the classification mask comprises bit 0 to indicate a source IP address,
bit 1 to indicte a destination IP address,
bit 2 to indicate a source TCP/UDP port,
bit 3 to indicate a destination TCP/UDP port,
bit 4 to indicate an incoming port,
bit 5 to indicate a type of service byte,
bit 6 to indicate a type of protocol used, and
bit 7 to indicate a TCP ACK flag.

15. The machine-readable medium of claim 14, wherein the QoS of packets includes a set of parameters which describe required traffic characteristics of a data connection of the packets, including a minimum bandwidth, a maximum delay, a maximum loss and jitter of the data connection, wherein each of the packets includes a packet header having a type of service field to store a value indicating a level of the QoS required for the respective packet, and wherein the level of the QoS is used to identify a class of policy for processing the respective packet by the network element.

16. The machine-readable medium of claim 14, wherein the selectively deleting classes of the current policy tree comprises deleting a class of the current policy tree upon determining that a set of classification rules of the class of the current policy tree is different than a set of classification rules of a corresponding class of the new policy tree.

17. The machine-readable medium of claim 16 wherein each class in the current and new policy tree is positioned at a level in the current and new policy tree and wherein the selectively deleting classes of the current policy tree comprises deleting a leaf class of the current policy tree upon determining that that the leaf class of the current policy tree is not positioned at a same level as a leaf class of the new policy tree.

18. The machine-readable medium of claim 14, wherein the selectively deleting classes of the current policy tree comprises selectively deleting at least one leaf class of the current policy tree.

19. The machine-readable medium of claim 14, wherein the selectively deleting classes of the current policy tree comprises selectively deleting at least one non-leaf class of the current policy tree.

20. The machine-readable medium of claim 14, wherein each class is positioned at a level in a policy tree and wherein a leaf class of the current policy tree is identical to a leaf class of the new policy tree only if the leaf class of the current policy tree and the leaf class of the new policy tree are positioned at an equal level.

21. The machine-readable of claim 20, wherein each leaf class in the current policy tree and the new policy tree is reciprocally linked to an associated path of non-leaf classes in the current policy tree and new policy tree, respectively, and wherein the selectively deleting the classes of the current policy tree comprises deleting each leaf class in the current policy tree upon determining that the associated path of non-leaf classes in the current policy tree is different from the path of non-leaf classes in the new policy tree for a leaf class.

22. The machine-readable medium of claim 14, wherein each class in the current and new policy tree is positioned at a level in the current and new policy tree, wherein each leaf class in the current policy tree and the new policy tree is reciprocally linked to an associated path of non-leaf classes in the current policy tree and new policy tree, respectively, and wherein the selectively deleting classes of the current policy tree comprises deleting a leaf class of the current policy tree upon determining that the associated path of non-leaf classes linked to the leaf class of the current policy tree includes a non-leaf class positioned at a different level than a corresponding non-leaf class included in the associated path of non-leaf classes linked to the leaf class of the new policy tree.

23. The machine-readable medium of claim 22, wherein the selectively deleting classes of the current policy tree comprises deleting a leaf class of the current policy tree upon determining that all parents of the leaf class of the current policy tree and corresponding parents of the leaf of the new policy tree have fewer identical descendant classes than those had by a class of the current policy tree and a class of the new policy tree positioned at the same level as the parents of the leaf class of the current policy tree and the parents of the leaf class of the new policy tree.

24. The machine-readable medium of claim 14, wherein each class identifies a subset of packets using one or more classification rules, each classification rule including one or more rule terms, and each rule term including an identity of a data item and a set of constant values associated with the data item, wherein the set of constant values includes at least one of individual values, ranges of constant values, IP subnets expressed in a notation of A.B.C.D/E where A.B.C.D is an IP address and /E indicates a number of leading bits that identify the subnet portion of the IP address.

25. The machine-readable medium of claim 24, wherein the data item is one of a source IP address, destination IP address, TCP/UDP source port, TCP/UDP destination port, ingress port of the network element, a type of service byte, a protocol type, and TCP acknowledgement flag.

26. The machine-readable medium of claim 25, wherein when a data packet is received at the network element, classification rules are evaluated to classify the data packet, wherein if the value of the data item matches any of the constant values associated with a rule term, the rule term is satisfied, wherein if all rule terms of a classification tule are satisfied, the classification rule is satisfied, and wherein the classification rule is satisfied, the data packet is considered to belong to a class associated with the satisfied classification rule.

27. The network element, comprising:
a processor; and
a memory coupled to the processor for storing instructions, when executed from
the memory, cause the processor to perform operations including receiving a new policy tree at a network element in a network, wherein the
network element stores a current policy tree of classes for quality of
service (AoS) of packets being processed by the network element,
and wherein the classes of the current policy tree and the classes of
the new policy tree include leaf classes and non-leaf classes,
comparing the classes of the current policy tree with the classes of the new policy tree, including:
for the current policy tree and the new policy tree, merging, into a
set of classification rules of the leaf classes, classification rules of non-leaf classes that are parents of the leaf classes,
identifying a leaf class in the current policy tree as identical to a leaf
class in the new policy tree upon determining that the set of classification rules of the leaf class in the current policy tree is equal to the set of classification rules of the leaf class in the new policy tree,
identifying a non-leaf class in the current policy tree as identical to
a non-leaf class in the new policy tree upon determining that the non-leaf class in the current policy tree and the non-leaf
class in the new policy tree share a greatest number of equivalent descendant leaf classes, and
marking the classes of the current policy tree and the new policy
tree as added, deleted, modified or unchanged based on the
identifying of the identical leaf and non-leaf classes in the current policy tree and new policy tree, and
selectively deleting classes of the current policy tree based on the
comparing of the classes,
verifying each class of the new policy tree with respect to remaining classes of the new policy tree to avoid conflicts when the new policy is merged into a merged policy tree,
associating the merged policy tree with a termination point to activate the merged policy tree on the termination point, and
processing data packets using a packet processing pipeline according to the merged policy tree, the packet processing pipeline including an incoming packet manager (IPM) to examine a packet header of data packets to determine a next hop of the data packets, a class identifier (CI) coupled to the IPM to classify the data packets using the merged policy tree, a route identifier (RI) coupled to the CI to determine which output port through which each of the data packets should be routed, an outgoing packet manager (OPM) coupled to the RI to store the data packets for outgoing purposes, a flow identifier (FI) coupled to the OPM to identify one or more flows of which the data packets belong, and a traffic manager (TM) coupled to the FI to schedule the data packets out of the output port using a result of the FI and the merged policy tree, wherein each class includes a class name, a type of service, and an amount of bandwidth associated with the respective class, wherein the leaf classes do not have a child class and are orthogonal to a remainder of the leaf classes, and wherein each non-leaf class as a parent class includes at least one leaf class as a child class and each leaf class includes a set of rules that are constrained by a parent class associated with the respective leaf class, wherein a class having a parent class further includes all classification rules included in the parent class, wherein a leaf class as a child of the parent class includes a set of its own rules and attributes and inherits all rule and attributes of its parent class except a root of the respective policy tree, the root representing a data link associated with an output port of the network element, and wherein the rules and attributes of a child class further limit the rules and attributes of its parent, wherein each of the classes having at least two children classes is identified as a scheduling class and each of the classes not having a child class is identified as a flow class, wherein packets of each flow class are processed in an order of the packet stored in a queue and packets of each scheduling class are processed according to a predetermined schedule, and wherein at least one of the children classes of a scheduling class contains one or more flows that match the respective scheduling class and are not contained in a remainder of the children classes associated with the respective scheduling class, wherein the network element includes an Ethernet interface card (EIC) coupled to a local area network (LAN) and an ATM interface card (AIC) coupled to a wide area network (WAN), and wherein processing data packets using a packet processing pipeline further comprises in response to a data packet received at the EIC from the LAN, a CI of the EIC classifying the data packet using identification of the policy tree, an RI of the EIC determining an output port through which the data packet should be routed using information of the policy tree, a FI of the AIC determining a flow to which the data packet belongs, using the policy tree, and transmitting the data packet to the WAN through the output port according to QoS based on the policy tree, wherein the network element further comprises a controller card, wherein the controller card is to perform the following operations compiling each policy tree and generate a class lookup table (CLT) accessible by a CI of the EIC, associating each policy tree with a termination point and generate a routing table accessible by each RI for looking up a next hop based on a class ID, and creating a list of flow identifier and scheduling update commands to incrementally change the flow tables for FIs and traffic manager tables for TMs using flow class and scheduling class property information of the policy tree, wherein associating the policy tree with a termination point comprises creating tables required by the CI and IPM, differentiating between classes that are currently in service from classes that will be put into services to generate a list of FI and TM update commands, distributing and synchronizing deleted classes by applying the tables and delete commands, distributing and synchronizing added classes by applying the tables and add commands, and distributing and synchronizing modified classes by applying the tables and modify commands, and wherein each class comprises one or more classification rules, QoS requirements, and a classification mask to specify which dimensions are specified in terms of the one or more classification rules, where the classification mask comprises bit 0 to indicate a source IP address,
bit 1 to indicate a destination IP address,
bit 2 to indicate a source TCP/UDP port,
bit 3 to indicate a destination TCP/UDP port,
bit 4 to indicate an upcoming port,
bit 5 to indicate a type of service byte,
bit 6 to indicate a type of protocol used, and
bit 7 to indicate a TCP ACK flag.

* * * * *